United States Patent
Banerjee et al.

(10) Patent No.: US 9,063,291 B2
(45) Date of Patent: *Jun. 23, 2015

(54) OMNIDIRECTIONAL REFLECTOR

(75) Inventors: Debasish Banerjee, Ann Arbor, MI (US); Minjuan Zhang, Ann Arbor, MI (US); Masahiko Ishii, Okazaki (JP)

(73) Assignees: Toyota Motor Engineering & Manufacturing North America, Inc., Erlanger, KY (US); Toyota Motor Corporation, Toyota (JP)

( * ) Notice: Subject to any disclaimer, the term of this patent is extended or adjusted under 35 U.S.C. 154(b) by 347 days.

This patent is subject to a terminal disclaimer.

(21) Appl. No.: 13/021,730

(22) Filed: Feb. 5, 2011

(65) Prior Publication Data

US 2011/0128616 A1  Jun. 2, 2011

Related U.S. Application Data

(63) Continuation-in-part of application No. 12/793,772, filed on Jun. 4, 2010, now Pat. No. 8,736,959, and a continuation-in-part of application No. 11/837,529, filed on Aug. 12, 2007, now Pat. No. 7,903,339.

(51) Int. Cl.
G02B 1/10 (2006.01)
G02B 5/28 (2006.01)
G02B 5/08 (2006.01)

(52) U.S. Cl.
CPC .............. *G02B 5/285* (2013.01); *G02B 5/0825* (2013.01); *G02B 5/085* (2013.01)

(58) Field of Classification Search
USPC ......... 359/585, 586, 587, 588, 589, 359, 360, 359/584; 257/98; 428/403, 446, 412
See application file for complete search history.

(56) References Cited

U.S. PATENT DOCUMENTS

| 3,953,643 A | 4/1976 | Cheung et al. |
| 4,556,599 A | 12/1985 | Sato et al. |
| 4,705,839 A | 11/1987 | Martin |

(Continued)

FOREIGN PATENT DOCUMENTS

| CN | 1527100 A | 9/2004 |
| CN | 1741246 A | 3/2006 |

(Continued)

OTHER PUBLICATIONS

U.S. Appl. No. 12/389,221.

(Continued)

Primary Examiner — Audrey Y Chang
(74) Attorney, Agent, or Firm — Gifford, Krass, Sprinkle, Anderson & Citkowski, P.C.

(57) ABSTRACT

An omnidirectional structural color (OSC) having a non-periodic layered structure. The OSC can include a multilayer stack that has an outer surface and at least two layers. The at least two layers can include at least one first index of refraction material layer A1 and at least one second index of refraction material layer B1. The at least A1 and B1 can be alternately stacked on top of each other with each layer having a predefined thickness $d_{A1}$ and $d_{B1}$, respectively. The $d_{A1}$ is not generally equal to the $d_{B1}$ such that the multilayer stack has a non-periodic layered structure.

9 Claims, 13 Drawing Sheets

(56) References Cited

U.S. PATENT DOCUMENTS

| | | | |
|---|---|---|---|
| 4,753,829 A | 6/1988 | Panush | |
| 4,756,602 A | 7/1988 | Southwell et al. | |
| 4,896,928 A * | 1/1990 | Perilloux et al. | 359/359 |
| RE33,729 E | 10/1991 | Perilloux | |
| 5,437,931 A * | 8/1995 | Tsai et al. | 428/446 |
| 5,472,798 A | 12/1995 | Kumazawa et al. | |
| 5,569,332 A | 10/1996 | Glatfelter et al. | |
| 5,700,550 A * | 12/1997 | Uyama et al. | 428/212 |
| 5,982,078 A | 11/1999 | Krisl et al. | |
| 6,156,115 A | 12/2000 | Pfaff et al. | |
| 6,215,592 B1 | 4/2001 | Pelekhaty | |
| 6,242,056 B1 | 6/2001 | Spencer et al. | |
| 6,249,378 B1 | 6/2001 | Shimamura et al. | |
| 6,331,914 B1 | 12/2001 | Wood, II et al. | |
| 6,399,228 B1 | 6/2002 | Simpson | |
| 6,433,931 B1 | 8/2002 | Fink et al. | |
| 6,565,770 B1 | 5/2003 | Mayer et al. | |
| 6,596,070 B1 | 7/2003 | Schmidt et al. | |
| 6,844,976 B1 | 1/2005 | Firon et al. | |
| 6,873,393 B2 | 3/2005 | Ma | |
| 6,903,873 B1 | 6/2005 | Joannopoulos et al. | |
| 6,913,793 B2 | 7/2005 | Jiang et al. | |
| 6,997,981 B1 | 2/2006 | Coombs et al. | |
| 7,052,762 B2 | 5/2006 | Hebrink et al. | |
| 7,064,897 B2 | 6/2006 | Hebrink et al. | |
| 7,106,516 B2 | 9/2006 | Lotz et al. | |
| 7,141,297 B2 | 11/2006 | Condo et al. | |
| 7,215,473 B2 | 5/2007 | Fleming | |
| 7,326,967 B2 * | 2/2008 | Hsieh et al. | 257/98 |
| 7,329,967 B2 | 2/2008 | Nozawa et al. | |
| 7,352,118 B2 | 4/2008 | Chowdhury et al. | |
| 7,367,691 B2 * | 5/2008 | Lin | 362/293 |
| 7,452,597 B2 | 11/2008 | Bujard | |
| 7,745,312 B2 | 6/2010 | Herner et al. | |
| 7,847,342 B2 | 12/2010 | Fukuzumi et al. | |
| 7,863,672 B2 | 1/2011 | Jin et al. | |
| 7,903,339 B2 | 3/2011 | Banerjee et al. | |
| 7,929,730 B2 | 4/2011 | Huang et al. | |
| 8,013,383 B2 | 9/2011 | Kidoh et al. | |
| 8,313,798 B2 | 11/2012 | Nogueira et al. | |
| 8,323,391 B2 | 12/2012 | Banerjee et al. | |
| 8,329,247 B2 | 12/2012 | Banerjee et al. | |
| 8,350,314 B2 | 1/2013 | Fukuzumi et al. | |
| 8,446,666 B2 | 5/2013 | Kurt et al. | |
| 8,593,728 B2 | 11/2013 | Banerjee et al. | |
| 8,736,959 B2 * | 5/2014 | Grayson et al. | 359/584 |
| 2002/0030882 A1 | 3/2002 | Vitt et al. | |
| 2003/0002157 A1 | 1/2003 | Someno | |
| 2003/0059549 A1 | 3/2003 | Morrow et al. | |
| 2004/0156984 A1 | 8/2004 | Vitt et al. | |
| 2004/0252509 A1 | 12/2004 | Lin | |
| 2005/0132929 A1 * | 6/2005 | Raksha et al. | 106/415 |
| 2005/0152417 A1 | 7/2005 | Lin | |
| 2005/0264874 A1 | 12/2005 | Lin | |
| 2006/0006402 A1 | 1/2006 | Hsieh et al. | |
| 2006/0081858 A1 | 4/2006 | Lin et al. | |
| 2006/0145172 A1 | 7/2006 | Su et al. | |
| 2007/0097509 A1 * | 5/2007 | Nevitt et al. | 359/584 |
| 2009/0046368 A1 | 2/2009 | Banerjee et al. | |
| 2009/0153953 A1 | 6/2009 | Banerjee et al. | |
| 2009/0161220 A1 | 6/2009 | Banerjee et al. | |
| 2010/0064938 A1 | 3/2010 | Voit et al. | |
| 2010/0208338 A1 | 8/2010 | Banerjee et al. | |
| 2010/0209593 A1 | 8/2010 | Banerjee et al. | |
| 2011/0091658 A1 | 4/2011 | Banerjee et al. | |
| 2011/0113984 A1 | 5/2011 | Fuller, Jr. et al. | |
| 2011/0128616 A1 | 6/2011 | Banerjee et al. | |
| 2011/0134515 A1 | 6/2011 | Banerjee et al. | |
| 2011/0299154 A1 | 12/2011 | Grayson et al. | |
| 2012/0307369 A1 | 12/2012 | Banerjee et al. | |
| 2013/0148221 A1 | 6/2013 | Banerjee et al. | |
| 2013/0265668 A1 | 10/2013 | Banerjee et al. | |
| 2014/0111861 A1 | 4/2014 | Banerjee et al. | |

FOREIGN PATENT DOCUMENTS

| | | |
|---|---|---|
| JP | 07034324 | 2/1995 |
| JP | 2006506518 A | 2/2006 |
| WO | WO-99/42892 A1 | 8/1999 |
| WO | WO-00/22466 A1 | 4/2000 |

OTHER PUBLICATIONS

Sajeev John et al., Photonic Band Gap Materials; A Semiconductor for Light; Department of Physics, University of Toronto, p. 1-23.

Kate Kaminska et al., Birefringent Omnidirectional Reflector; Applied Optics; vol. 43, No. 7; Mar. 2004.

M. Deopura et al., Dielectric Omnidirectional Visible Reflector; Optical Society of America; vol. 26, No. 15; Department of Material Science and Engineering, Massachusetts Institute of Technology; pp. 1197-1199.

Distributed Bragg Reflector, en.wikipedia.org/wiki/Bragg_reflector.

Photonic Crystal; en.wikipedia.org/wiki/Photonic_crystals.

Optical Coating Design Algorithm Based on the Equivalent Layers Theory; Alexander V. Tikhonravov et al; Applied Optics; vol. 45, No. 7; Mar. 2006.

Tikhonravov, et al., "Application of the Needle Optimization Technique to the Design of Optical Coatings", Applied Optics, Optical Society of America, 1996, pp. 5493-5508, vol. 35, No. 28.

* cited by examiner

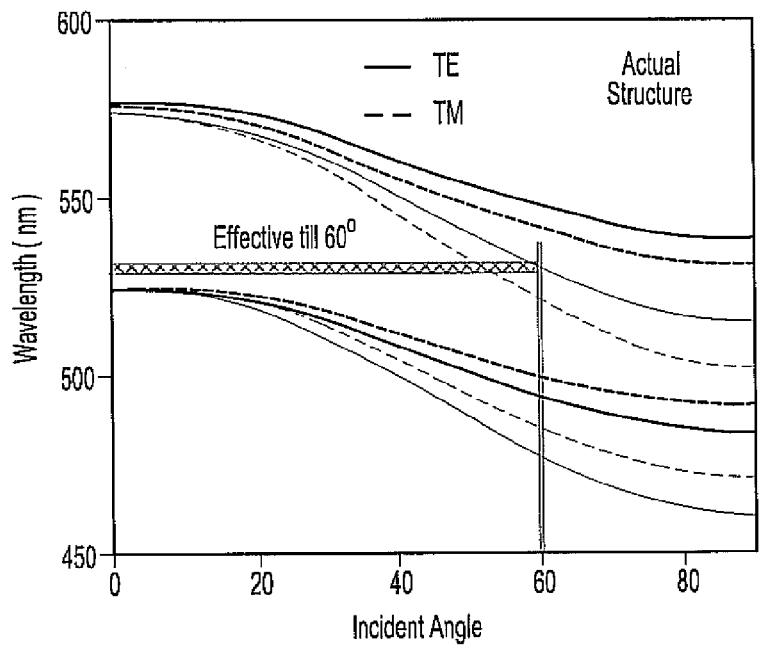
*Fig-1c*
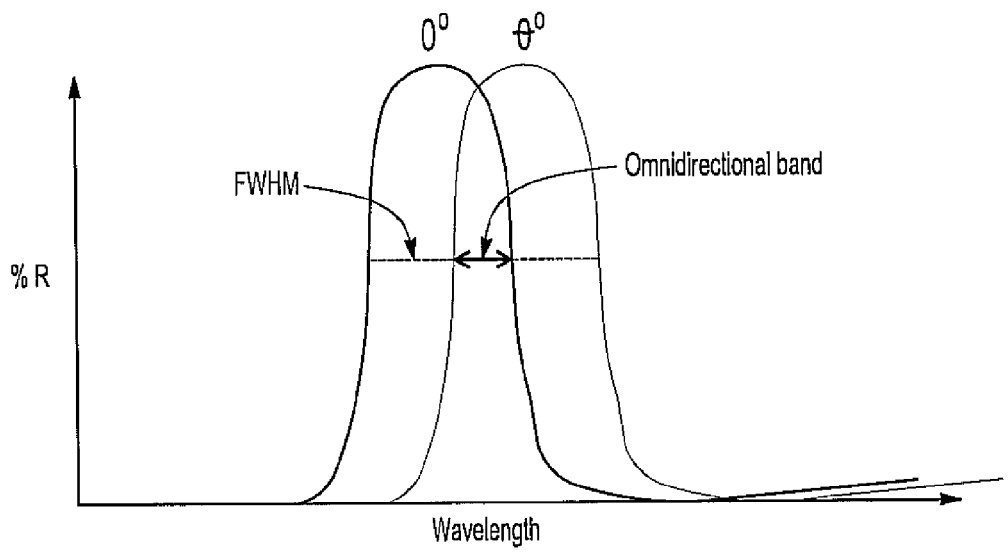
*Fig-1d*
*Fig-2*

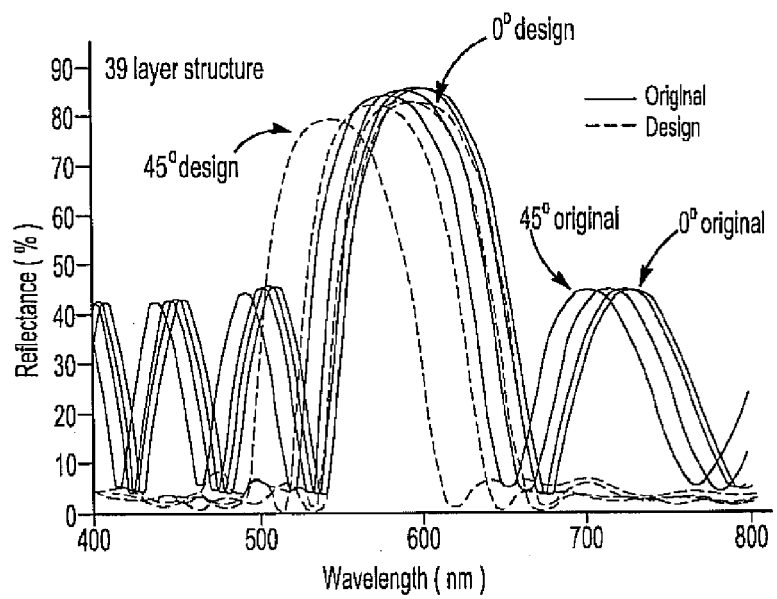
Fig-5
Fig-6
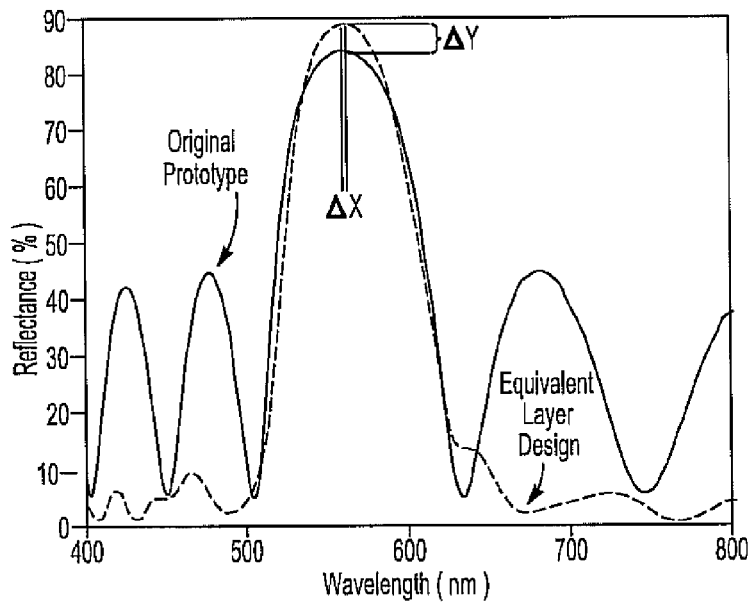
Fig-7

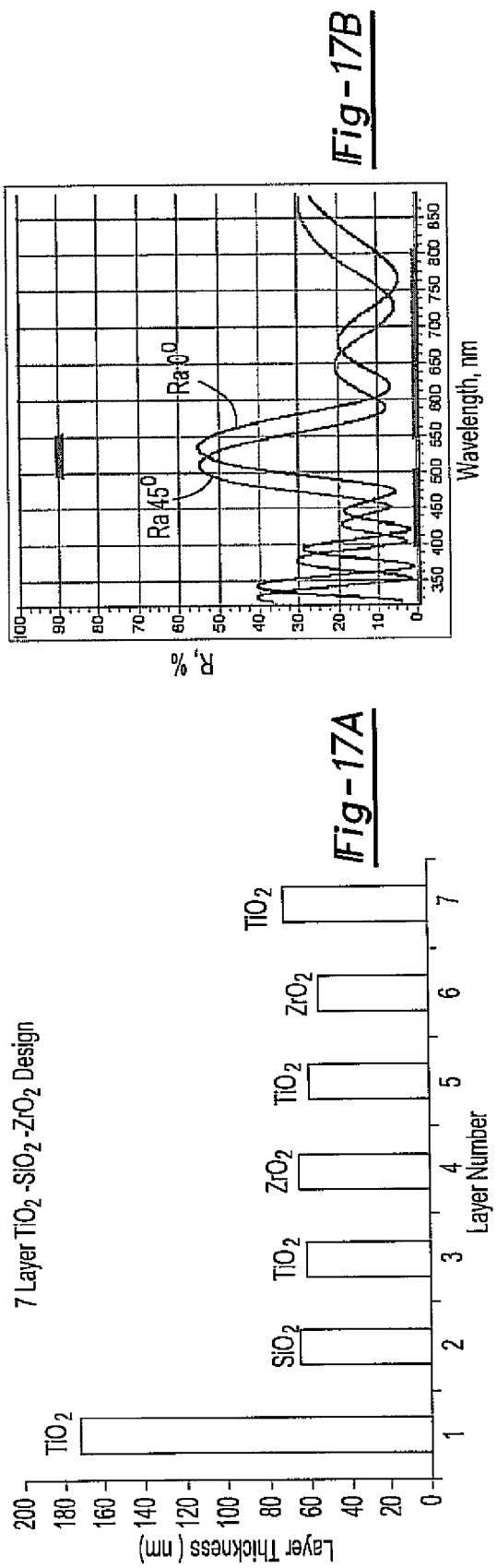
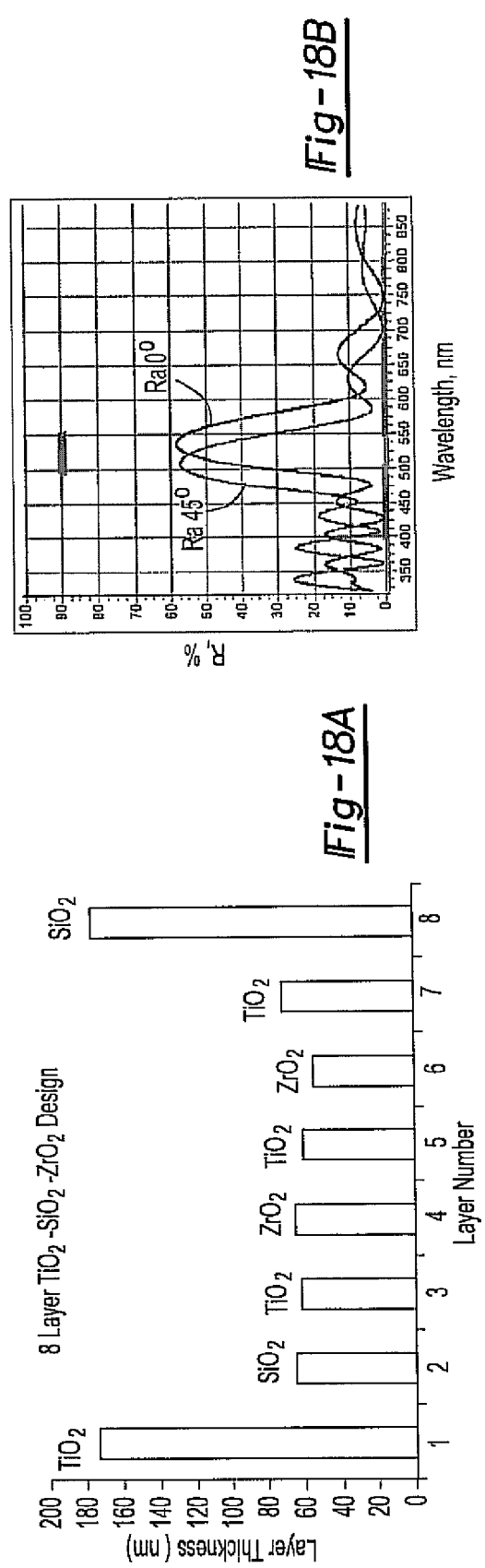

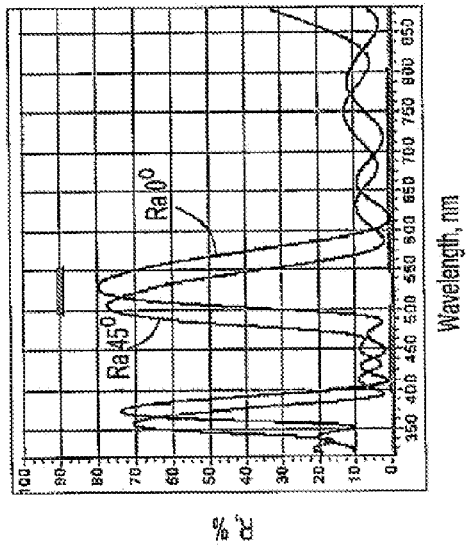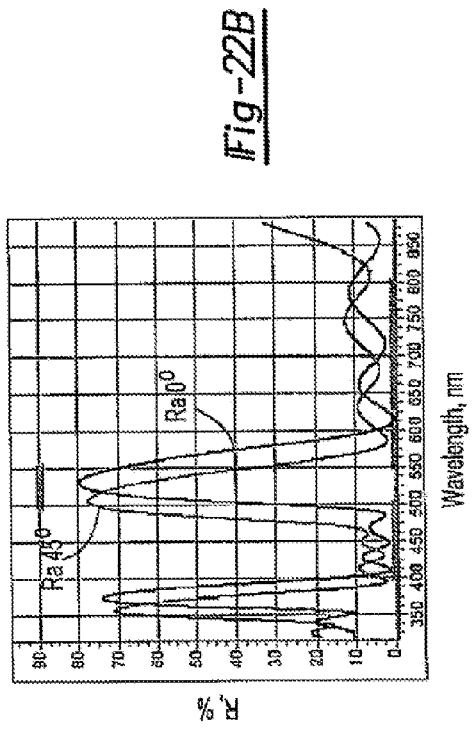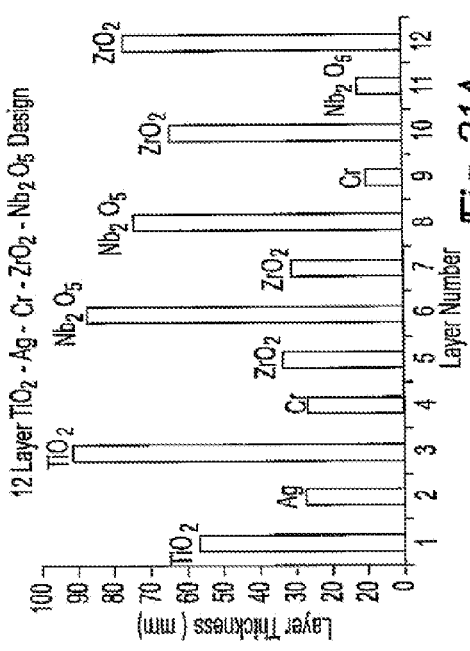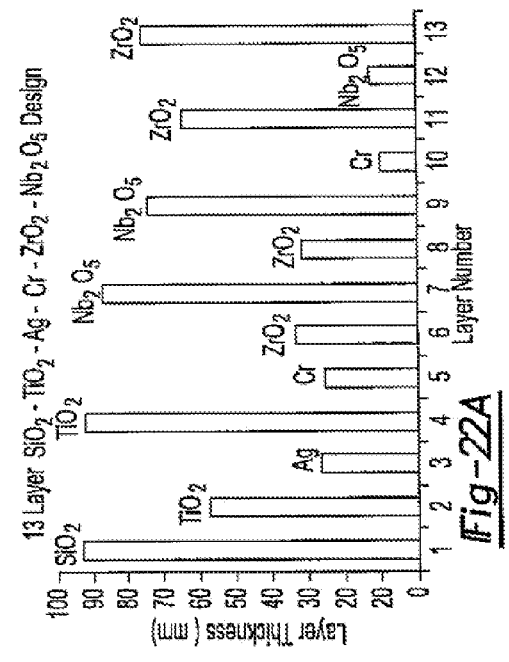

OMNIDIRECTIONAL REFLECTOR

CROSS REFERENCE TO RELATED APPLICATIONS

This application is a continuation-in-part and claims priority to U.S. patent application Ser. No. 11/837,529 filed Aug. 12, 2007, and U.S. patent application Ser. No. 12/793,772 filed Jun. 4, 2010, both of which are incorporated in their entirety herein by reference.

FIELD OF THE INVENTION

The present invention relates to an omnidirectional reflector, and in particular, to an omnidirectional reflector that is a structural color and is made from materials having relatively low indices of refraction.

BACKGROUND OF THE INVENTION

Based on theoretical calculations of a one-dimensional (1-D) photonic crystal, design criteria for omnidirectional (angle independent) structural colors have been developed as taught in co-pending U.S. patent application Ser. No. 11/837,529 (U.S. Patent Application Publication No. 2009/0046368, hereafter '529). As taught in '529, FIG. 1a illustrates a graph of a range to mid-range ratio equal to 0.2% for transverse magnetic mode (TM) and transverse electric mode (TE) of electromagnetic radiation plotted as a function of high refractive index versus low refractive index. This figure also shows two data points: one corresponding to an "ideal" multilayer stack made from a first material with a refractive index of 2.8 and a second material with a refractive index of 2.5; and another one corresponding to an actual fabricated multilayer stack made from vacuum deposition of $TiO_2$ with a resulting refractive index of 2.3 and $HfO_2$ with a resulting refractive index of 2.0.

Turning to FIG. 1b, a plot of reflectance as a function of incident angle illustrates the omnidirectional properties exhibited by the ideal multilayer stack when viewed from angles between 0 and 90 degrees. In contrast, FIG. 1c illustrates a reduction in the omnidirectional properties exhibited by the actual fabricated multilayer stack, in particular a decrease in the angle-independent reflectance from 0-90 degrees to 0-60 degrees.

On a plot of reflectance versus wavelength, an angle independent band of reflected electromagnetic radiation is the common reflectance of a multilayer stack when view from angles between 0 and theta ($\theta$) degrees as illustrated by the range of wavelengths indicated by the double headed arrow in FIG. 1d. For the purposes of the present invention, this band of angle independent reflected radiation is measured at the average of the full width at half maximum (FWHM) for the two reflectance curves (0° and $\theta$°) and can hereafter be referred to as an omnidirectional band when viewed between angles of 0 and $\theta$ degrees. It is appreciated that the extent of omnidirectional reflection, that is $\theta$, for FIGS. 1b and 1c is 90 and 60 degrees, respectively.

It is appreciated that fabricating omnidirectional structural colors with less than desired indices of refraction can result in less than desired angle independence reflection. In addition, fabricating omnidirectional structural colors with materials that exhibit relatively high indices of refraction can be cost prohibitive. Therefore, a multilayer stack that provides omnidirectional structural color and can be made from materials that have relatively low indices of refraction would be desirable.

SUMMARY OF THE INVENTION

The present invention discloses an omnidirectional structural color (OSC) having a non-periodic layered structure. The OSC can include a multilayer stack that has an outer surface and at least two layers. The at least two layers can include at least one first index of refraction material layer A1 and at least one second index of refraction material layer B1. The at least A1 and B1 can be alternately stacked on top of each other with each layer having a predefined thickness $d_{A1}$ and $d_{B1}$, respectively. The thickness $d_{A1}$ is not generally equal to the thickness $d_{B1}$ such that the multilayer stack has the non-periodic layered structure. In addition, the multilayer stack can have a first omnidirectional reflection band that reflects more than 50% of a narrow band of electromagnetic radiation of less than 500 nanometers when the outer surface is exposed to a generally broad band of electromagnetic radiation, such as white light, at angles between 0 and 45 degrees normal to the outer surface.

In some instances, at least one third index of refraction material layer C1 having a predefined thickness $d_{C1}$ can be included. The at least A1, B1 and C1 can be alternately stacked on top of each other and the thickness $d_{C1}$ can be generally not equal to $d_{A1}$ and $d_{B1}$. In other instances, the multilayer stack can include at least one fourth index of refraction material layer D1 having a predefined thickness $d_{D1}$, with at least one A1, B1, C1 and D1 being alternately stacked on top of each other and the thickness $d_{D1}$ not being generally equal to $d_{A1}$, $d_{B1}$ and $d_{C1}$.

In still yet other instances, the multilayer stack can include at least one fifth index of refraction material layer E1 having a predefined thickness $d_{E1}$, with the at least A1, B1, C1, D1 and E1 being alternately stacked on top of each other and the thickness $d_{E1}$ not being generally equal to $d_{A1}$, $d_{B1}$, $d_{C1}$ and $d_{D1}$.

The first, second, third, fourth and/or fifth index of refraction materials can be selected from any material known to those skilled in the art that are used now, or can be used in the future, to produce multilayer structures having at least three layers. For example and for illustrative purposes only, the materials can include titanium oxide, silicon oxide, mica, zirconium oxide, niobium oxide, chromium, silver, and the like. In addition, it is appreciated that the invention is not limited to five different index of refraction material layers and can include any number of different materials so long as a desired design parameter for the OSC is achieved.

A process for omnidirectionally reflecting a narrow band of electromagnetic radiation is also disclosed with the process including an OSC as described above and providing a source of broadband electromagnetic radiation. Thereafter, the OSC is exposed to the broadband electromagnetic radiation at angles between 0 and 45 degrees normal to the outer surface of the multilayer stack with reflection of more than 50% of a narrow band of electromagnetic radiation less than 500 nanometers wide being provided.

In some instances, the OSC and the process provided herein can reflect more than 50% of a narrow band of electromagnetic radiation of less than 200 nanometers when the outer surface of the multilayer stack is exposed to a generally broad band of electromagnetic radiation at angles between 0 and 60 degrees normal to the outer surface. In other instances, an OSC and the process can reflect more than 50% of a narrow band of electromagnetic radiation of less than 200 nanometers when the outer surface is exposed to a generally broad band of electromagnetic radiation at angles between 0 and 80 degrees. In still other instances, more than 50% of a narrow band less than 100 nanometers is reflected when the outer surface is exposed at angles between 0 and 45 degrees normal thereto. An OSC disclosed herein can also reflect more than 50% of infrared electromagnetic radiation having a wavelength of less than 400 nanometers in addition to the narrow band reflected as described above.

BRIEF DESCRIPTION OF THE DRAWINGS

FIG. 1c is a graphical representation illustrating an actual band structure for a fabricated omnidirectional reflector;

FIG. 1d is a graphical representation illustrating an omnidirectional band for a multilayer stack;

FIG. 2 illustrates a three-layer structure made from two different materials and a corresponding single equivalent layer;

FIG. 5 illustrates an improved design concept of equivalent layer approximations;

FIG. 6 is a graphical representation of reflectance versus wavelength for a 39-layer structure that is equivalent to a 13-layer structure;

FIG. 7 is a graphical representation of the difference in maximum wavelength ($\Delta X$) and maximum reflectance ($\Delta Y$) between the 39-layer structure and the 13-layer structure;

FIG. 17 is: (A) a graphical representation for the thickness and material for each layer of a 7-layer $TiO_2$—$SiO_2$—$ZrO_2$ multilayer stack design; and (B) a corresponding graphical representation illustrating an omnidirectional band for the multilayer stack in (A);

FIG. 18 is: (A) a graphical representation for the thickness and material for each layer of an 8-layer $TiO_2$—$SiO_2$—$ZrO_2$ multilayer stack design; and (B) a corresponding graphical representation illustrating an omnidirectional band for the multilayer stack in (A);

FIG. 21 is: (A) a graphical representation for the thickness and material for each layer of a 12-layer $TiO_2$—Ag—Cr—$ZrO_2$—$Nb_2O_5$ multilayer stack design; and (B) a corresponding graphical representation illustrating an omnidirectional band for the multilayer stack in (A);

FIG. 22 is: (A) a graphical representation for the thickness and material for each layer of a 13-layer $TiO_2$—Ag—Cr—$ZrO_2$—$Nb_2O_5$ multilayer stack design; and (B) a corresponding graphical representation illustrating an omnidirectional band for the multilayer stack in (A);

DETAILED DESCRIPTION OF THE INVENTION

Figure 1A:
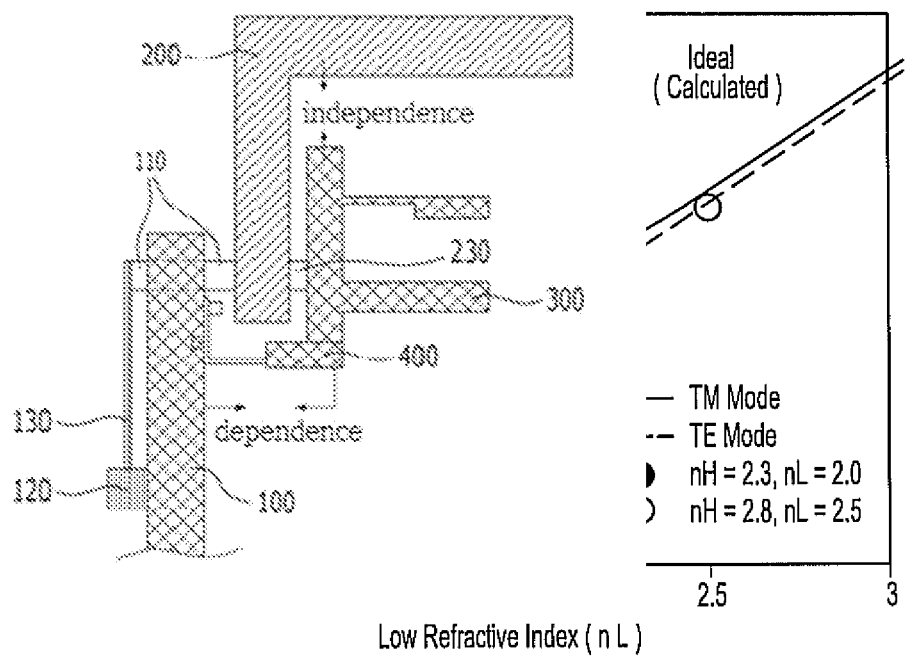
FIG. 1a is a graphical representation illustrating a refractive index zone necessary for omnidirectional structural color.
Figure 1B:
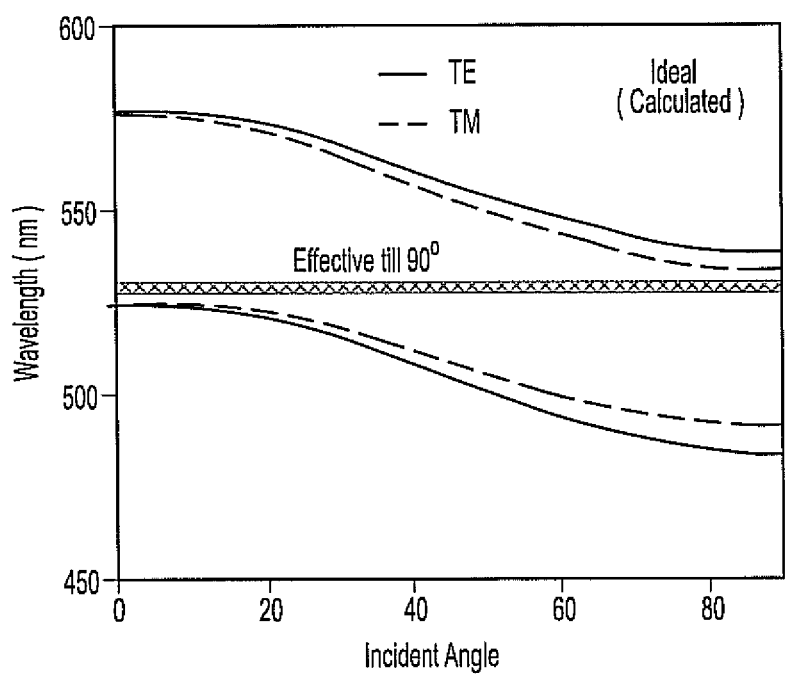
FIG. 1b is a graphical representation of a calculated or ideal band structure showing complete omnidirectionality.

The present invention discloses an omnidirectional reflector that can reflect a band of electromagnetic radiation of less than 500 nanometers when viewed from angles between 0 and 45 degrees. Stated differently, the omnidirectional reflector has an omnidirectional band of less than 500 nanometers when viewed from angles between 0 and 45 degrees. The omnidirectional reflector can include a multilayer stack with a plurality of layers of a high index of refraction material and a plurality of layers of a low index of refraction material. The plurality of layers of high index of refraction material and low index of refraction material can be alternately stacked on top of and/or across each other and have thicknesses such that a non-periodic structure is provided. In some instances, the omnidirectional band is less than 200 nanometers when viewed from angles between 0 and 65 degrees and in other instances, omnidirectional band is less than 200 nanometers when viewed from angles between 0 and 80 degrees.

The high index of refraction material can have a refractive index between 1.5 and 2.6, inclusive, and the low index of refraction material can have an index of refraction between 0.75 and 2.0, inclusive. In some instances, the multilayer stack can have at least 2 total layers, while in other instances the multilayer stack can have at least 3 total layers. In still other instances, the multilayer stack can have at least 7 total layers. In still yet other instances, the multilayer stack has at least 13 layers, or in the alternative, at least 19 layers.

With regard to the non-periodic layered structure, the plurality of layers of high index of refraction material can be designated as H1, H2, H3 ... Hn and the plurality of layers of low index of refraction material can be designated L1, L2, L3 ... Lm, with the layers having predefined thicknesses designated as $d_{H1}$, $d_{H2}$, $d_{H3}$ ... $d_{Hn}$ and $d_{L1}$, $d_{L2}$, $d_{L3}$ ... $d_{Lm}$, respectively. In addition, the thickness $d_{H1}$ is not generally equal to at least one of the thicknesses $d_{H2}$, $d_{H3}$ or $d_{Hn}$ and the thickness $d_{L1}$ is not generally equal to at least one of the thicknesses $d_{L2}$, $d_{L3}$ or $d_{Lm}$. In some instances, the thickness $d_{H1}$ is different than $d_{H2}$ and $d_{H3}$ and/or the thickness $d_{L1}$ is different than $d_{L2}$ and $d_{L3}$. In other instances, the thickness $d_{H1}$ is different than $d_{H2}$, $d_{H3}$ ... and $d_{Hn}$, and/or the thickness $d_{L1}$ is different than $d_{L2}$, $d_{L3}$ ... and $d_{Lm}$.

The multilayer stack can be in the form of a flake and the flake can have an average thickness range of between 0.5 and 5 microns and/or an average diameter of between 5 and 50 microns. The flake can be mixed with a binder to provide a paint and/or an ultraviolet protective coating.

A process for omnidirectionally reflecting a narrow band of electromagnetic radiation is also disclosed. The process includes providing a multilayer stack having a plurality of layers of high index of refraction material designated as H1, H2, H3 ... Hn, and a plurality of layers of low index of refraction material designated L1, L2, L3 ... Lm. The layers of different materials are alternately stacked on top of and/or across each other. The plurality of layers of high index of refraction material and low index of refraction material each have a predefined thickness designated as $d_{H1}$, $d_{H2}$, $d_{H3}$ ... $d_{Hn}$ and $d_{L1}$, $d_{L2}$, $d_{L3}$, ... $d_{Lm}$, respectively, and the thickness $d_{H1}$ can be different than $d_{H2}$, $d_{H3}$ ... and/or $d_{Hn}$ and the thickness $d_{L1}$ can be different than $d_{L2}$, $d_{L3}$ ... and/or $d_{Lm}$. As such, the multilayer stack can have a non-periodic layered structure.

A source of broadband electromagnetic radiation is also provided and used to illuminate the multilayer stack. Thereafter, an omnidirectional band of less than 500 nanometers is reflected from the multilayer stack when viewed from angles between 0 and 45 degrees. In some instances, the omnidirectional band of less than 200 nanometers is angle independent when viewed from angles between 0 to 65 degrees, and in still other instances, when viewed from angles between 0 to 80 degrees. The omnidirectional band can be within the visible light region, or in the alternative, within the ultraviolet region or the infrared region. In addition, the multilayer stack can be in the form of a flake, and the flake may or may not be mixed with a binder to make a paint that is an omnidirectional structural color.

Not being bound by theory, development of an inventive multilayer stack is discussed below. A theory of equivalent layers developed during research of equivalent layer techniques, and not addressing omnidirectionality as in the instant invention, states that optical properties of a single material can be replicated by a symmetrical combination of a three-layer structure having preset high and low refractive indices of refraction (see Alexander V. Tikhonravov, Michael K. Trubetskov, Tatiana V. Amotchkina, and Alfred Thelen, "Optical coating design algorithm based on the equivalent layers theory" Appl. Optics, 45, 7, 1530, 2006). For example, a three-layer two-material structure with indices of refraction equal to $n_1$ and $n_2$, and having physical thicknesses of $d_1$ and $d_2$ that is equivalent to a single layer of material having an index of refraction of N and a thickness of D is illustrated in FIG. 2. A characteristic matrix (M) can completely describe all of the structures optical properties and Herpin's theorem states that the equivalent single-layer structure can have the same optical properties as the three-layer structure if an equivalent matrix ($M_E$) can be achieved.

A solution for $M_E$ can result in a non-unique solution set which approximates the original structure. As such, expressions for M and $M_E$ shown in Equations 1 and 2 below can be used to establish criteria for the existence of an equivalent 3-layer structure in which each matrix element of the two matrices M and $M_E$ are equated to each other.

$$M = \begin{bmatrix} \cos 2\varphi_1 * \cos 2\varphi_2 - p * \sin 2\varphi_1 * \sin 2\varphi_2 & \frac{1}{n_1}\begin{pmatrix} \sin 2\varphi_1 * \cos 2\varphi_2 + \\ p * \cos 2\varphi_1 * \sin 2\varphi_2 + \\ q * \sin 2\varphi_2 \end{pmatrix} \\ in_1\begin{pmatrix} \sin 2\varphi_1 * \cos 2\varphi_1 + \\ p * \cos 2\varphi_1 * \sin 2\varphi_2 - \\ q * \sin 2\varphi_2 \end{pmatrix} & \cos 2\varphi_1 * \cos 2\varphi_2 - p * \sin 2\varphi_1 * \sin 2\varphi_2 \end{bmatrix} \quad (1)$$

where:

$$p = \frac{1}{2}\left(\frac{n_1}{n_2} + \frac{n_2}{n_1}\right), \quad q = \frac{1}{2}\left(\frac{n_1}{n_2} - \frac{n_2}{n_1}\right), \quad \varphi_1 = \frac{2\pi}{\lambda}(n_1 d_1),$$

$$\varphi_2 = \frac{2\pi}{\lambda}(n_2 d_2), \quad \lambda = \text{reflected wavelength}$$

$$M_E = \begin{bmatrix} \cos\Phi & \frac{1}{N}\sin\Phi \\ iN\sin\Phi & \cos\Phi \end{bmatrix} \quad (2)$$

In so doing, the following expressions of the structural parameters of the two materials used for the 3-layer structure can be derived:

$$\cos \Phi = \cos 2\phi_1 \cos 2\phi_2 - p \sin 2\phi_1 \sin 2\phi_2 \quad (3)$$

$$N = n_1 \sqrt{\frac{\sin 2\varphi_1 \cos 2\varphi_2 + p\cos 2\varphi_1 \sin 2\varphi_2 - q\sin 2\varphi_2}{\sin 2\varphi_1 \cos 2\varphi_2 + p\cos 2\varphi_1 \sin 2\varphi_2 + q\sin 2\varphi_2}} \quad (4)$$

and original designs of ideal omnidirectional reflectors can be replicated with equivalent structures made from different starting materials.

An illustrative example of the use of the theory of equivalent layers to design and/or provide an omnidirectional structural color is discussed below.

Example

Starting with a high index of refraction material with a refractive index of 2.89 and a low index of refraction material with a refractive index of 2.5, and using a quarter-wave thickness criterion, an expression for the thickness of the high index of refraction material $d_H$ and the thickness of the low index of refraction material $d_L$ for a given target wavelength $\lambda$ can be calculated from Equation 4 below:

$$d_H = \frac{\lambda}{4n_H}, d_L = \frac{\lambda}{4n_L} \tag{4}$$

Using a target wavelength of 575 nanometers, the layer thickness for the high index of refraction material is approximately 49.7 nanometers and the layer thickness for the low index of refraction material is approximately 57.5 nanometers. A resultant reflectance versus wavelength of such a structure can be generated using a one-dimensional (1-D) photonic calculator written for MATLAB. This calculator uses a matrix method to calculate the reflectivity, transmission, and absorptions of 1-D optically stratified medium.

Figure 3:
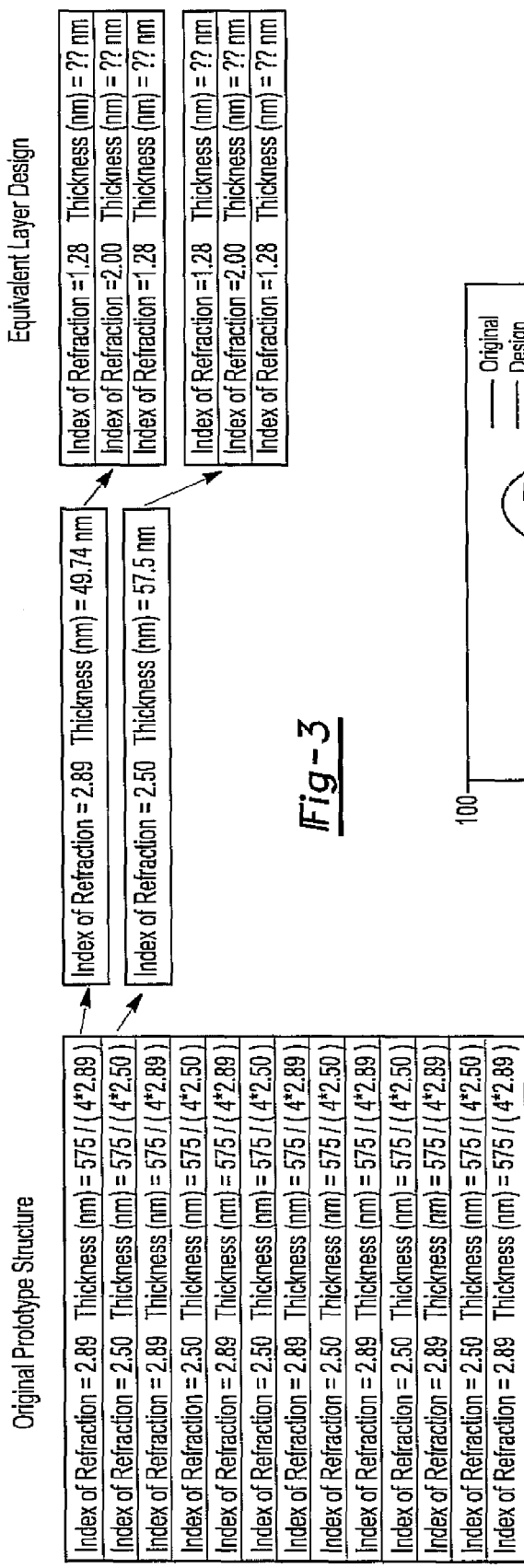
FIG. 3 illustrates an original prototype structure of an omnidirectional reflector and an equivalent layer design.

Regarding an equivalent design using different starting materials, a first material with a refractive index of 1.28 and a second material with a refractive index of 2.0 were assumed. In addition, an incident angle of 0 degrees for the illuminating electromagnetic radiation, natural light with 50% transverse electric and 50% transverse magnetic modes, a transfer medium of air and a substrate of glass were assumed. A schematic representation of the replacement of each original layer by three equivalent layers is shown in FIG. 3. As illustrated in this figure, the thicknesses of each equivalent layer used to replace each layer of the original prototype are values to be determined.

The simulation process is initiated with input of the indices of refraction for the high index of refraction material and the low index of refraction material of the original prototype. In addition, thicknesses of the two materials can be included and the 1-D photonic calculator can generate a reflectance versus wavelength plot.

Figure 4:
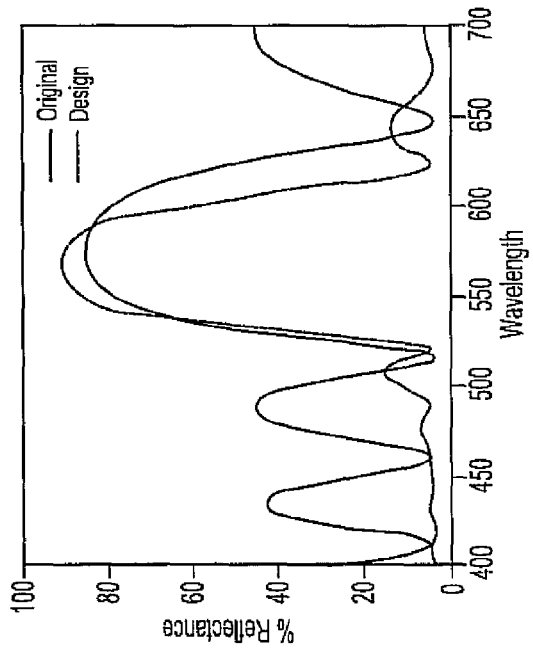
FIG. 4 is a graphical representation of reflectance versus wavelength for a 39-layer equivalent structure made from a first material and a second material replacing a 13-layer structure made from a low index of refraction material with a refractive index of 2.5 and a high index of refraction material with a refractive index of 2.89.

With regard to providing three equivalent layers to match the optical properties of each single layer, optimization consists of varying the thicknesses of the individual equivalent layers—assuming the first layer and the third layer are equal—and comparing the resultant wavelength versus reflectance curve to the original reference. An example of a simulation for replacing each layer of an original 13-layer stack with three equivalent layers is shown in FIG. 4 where an entire 13-layer original reference structure as illustrated in FIG. 3 was replicated with three equivalent layers replacing each of the original layers. Therefore, a simulation for 13×3=39 layers was chosen as a starting structure with the thicknesses of the first material ($n_1$=1.28) and the second material ($n_2$=2.0) were varied from 1 to 500 nanometers. FIG. 4 illustrates that optimization of the equivalent 39-layer structure with a first material thickness of 99 nanometers and a second material thickness of 14 nanometers provided similar results for reflectance as a function of wavelength when compared to the original 13-layer structure. The equivalent 39-layer structure also resulted in a drastic reduction in the side bands that are present for the original 13-layer structure. As such, an original two-material 13-layer structure having a high index of refraction material with a refractive index of 2.89 and a low index of refraction material with a refractive index of 2.5 is shown to be replaceable with a two-material 39-layer structure having a high index of refraction material with a refractive index of 2.0 and a low index of refraction material with a refractive index of 1.28.

In an effort to provide additional flexibility with respect to materials selection and manufacturing techniques, the concept of uncoupling the layers during optimization calculations of the layer thicknesses is introduced. As such, the previous concept of replacing the layers of the original 13-layer stack with repeating equivalent 3-layer stacks is discarded and each layer has its own multiplier that determines the final thickness thereof. For example, a 39-layer structure can have 39 separate multiplier variables, and thus 39 layers, each having a different thickness.

FIG. 5 illustrates a 39-layer structure where two materials are used, with one of the materials having a high index of refraction ($N_{high}$) and one of the materials having a low index of refraction ($N_{low}$). As shown in this figure, the thickness of each of these layers is equal to a multiplier ($Mult_i$) times a reference wavelength divided by the respective index of refraction and either 4 or 8. In addition, the alternating layers of high index of refraction material are designated H1, H2, H3 . . . Hn and the alternating layers of low index of refraction material designated L1, L2, L3 . . . Lm. Furthermore, the layers each have a thickness designated as $d_{H1}$, $d_{H2}$, $d_{H3}$ . . . $d_{Hn}$ and $d_{L1}$, $d_{L2}$, $d_{L3}$ . . . $d_{Lm}$ as shown in the figure. It is appreciated that it is not necessary to perform a one-quarter or one-eighth multiplier; however, in this example such a multiplier was included simply because of experience with previous experiments and/or calculations.

Turning now to Table 1 below, a list of multiplier values determined for a 39-layer structure and solved using a LSQCURVEFIT module within an optimization Toolbox™ from MATLAB is shown.

TABLE 1

"High" - Odd layer thicknesses (nm) = $Mult_i$ * 550/(8 * N) = $d_{Hi}$
"Low" - Even layer thicknesses (nm) = $Mult_j$ * 550/(4 * N) = $d_{Lj}$
(Multiplier List) Multiplier values

| (M1) | (M2) | (M3) | (M4) | (M5) | (M6) | (M7) |
|---|---|---|---|---|---|---|
| 0.0435 | 1.2139 | 0.1307 | 0.8384 | 2.2490 | 1.2396 | 1.7736 |
| (M8) | (M9) | (M10) | (M11) | (M12) | (M13) | (M14) |
| 1.1475 | 2.2261 | 0.0101 | 0.0122 | 1.0889 | 2.0830 | 1.1047 |
| (M15) | (M16) | (M17) | (M18) | (M19) | (M20) | (M21) |
| 2.2077 | 1.0959 | 0.0100 | 0.0101 | 2.0387 | 1.1277 | 2.0575 |
| (M22) | (M23) | (M24) | (M25) | (M26) | (M27) | (M28) |
| 1.4407 | 0.6883 | 1.8276 | 1.0380 | 0.5775 | 0.7862 | 0.6875 |
| (M29) | (M30) | (M31) | (M32) | (M33) | (M34) | (M35) |
| 0.7576 | 0.9844 | 0.3575 | 1.0429 | 0.5748 | 0.6599 | 0.9185 |
| (M36) | (M37) | (M38) | (M39) | | | |
| 0.7343 | 0.5068 | 0.876 | 0.3094 | | | |

Using the multipliers in Table 1 and incident angles of 0, 15, 30 and 45 degrees, calculations of the reflectance were performed in order to determine if a change in color, i.e. shift in band reflection, would occur at different angles. Desirably, the mean wavelength does not change with increasing angle and thus a truly omnidirectional color results. As shown in FIG. 6, with increasing incident angle, the calculations showed a continual "blue shift" of the mean reflected wavelength. However, this shift was less than 75 nanometers and thus a non-periodic layered structure exhibiting omnidirectional structural color is provided. In addition, it is appreciated that this shift of the mean wavelength is a shift of the center wavelength of the reflection band shown in FIG. 6.

In order to develop a broad evaluation of possible materials that can be used for making an omnidirectional reflector, calculations were performed for materials having refractive indices ranging from 1.4 to 2.3 for the "high" index materials and 1.2 to 2.1 for the "low" index materials. Optimization parameters were defined as the absolute value of the difference in maximum wavelengths ($\Delta X$) between an original prototype and an equivalent layer design, and the absolute value of the difference in maximum reflectance ($\Delta Y$) between the original prototype and the equivalent layer design. Examples of ΔX and ΔY are shown in FIG. 7 and it is appreciated that the X and Y coordinates for the maximum reflectance for the original prototype structure and the equivalent layer design were chosen to calculate ΔX and ΔY. In addition, in order to visually illustrate ΔX and ΔY as a function of refractive index pairs, plots such as FIGS. 8-11 were developed and discussed below.

Figure 8:
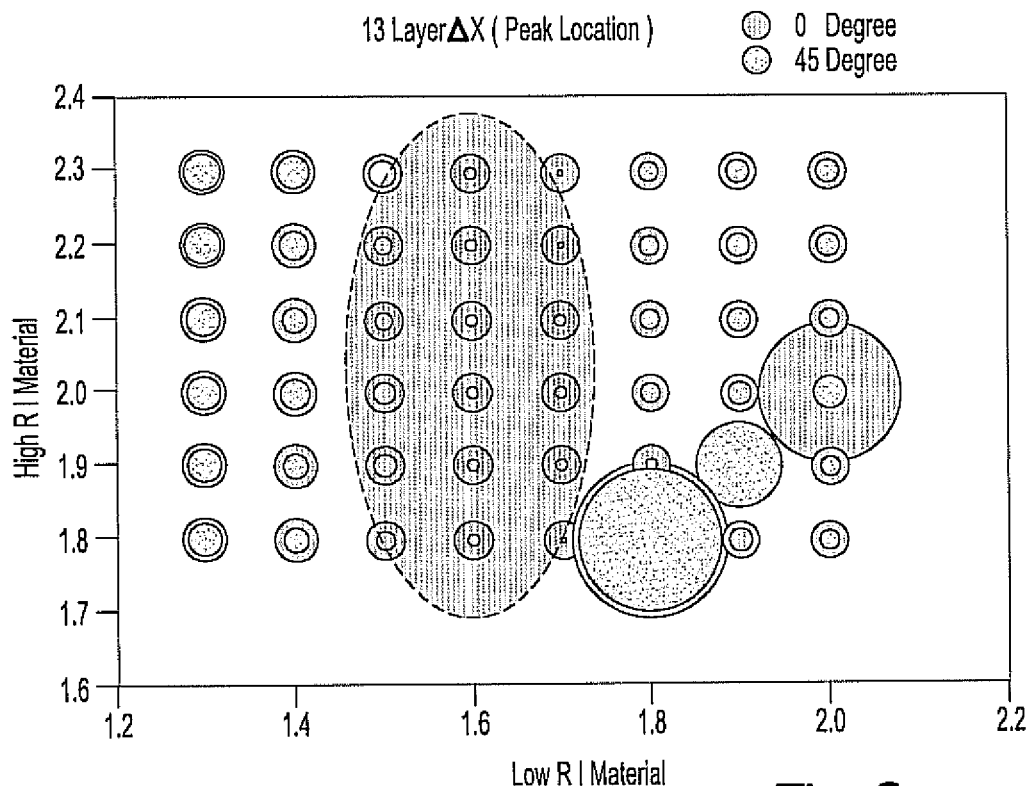
FIG. 8 is a plot of $\Delta X$ between a 13-layer periodic structure and an equivalent 13-layer non-periodic structure for a 0 and 45 degree incidence angles as a function of refraction index values for a low refraction index material and a high refractive index material.
Figure 9:
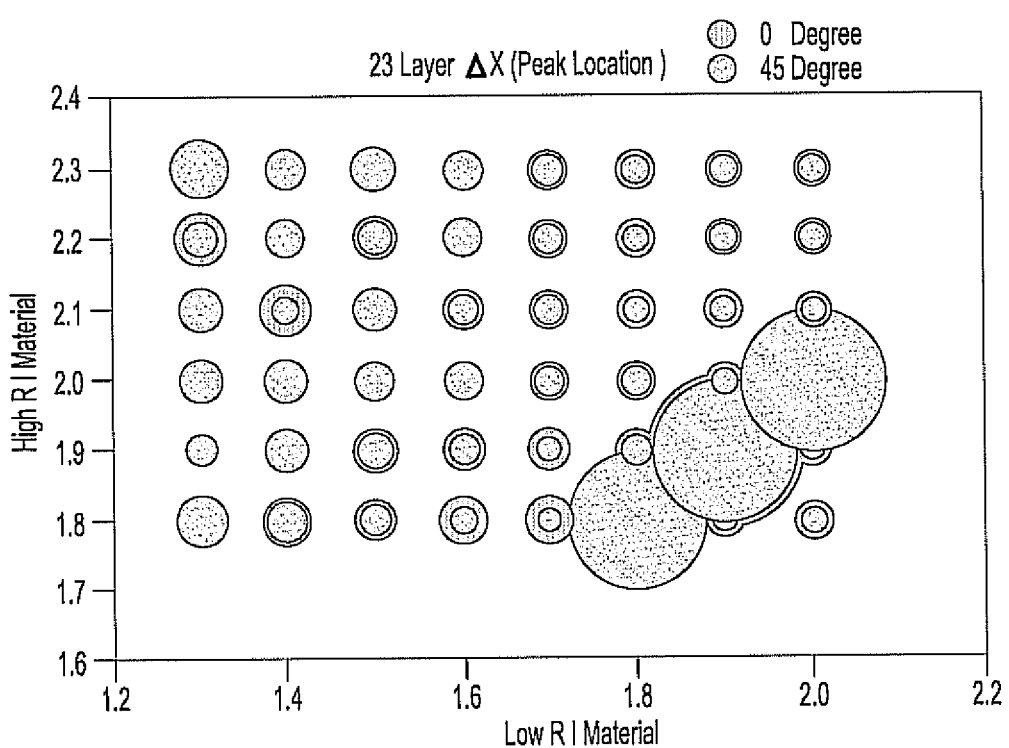
FIG. 9 is a plot of $\Delta X$ between a 23-layer periodic structure and an equivalent 23-layer non-periodic structure for a 0 and 45 degree incidence angles as a function of refraction index values for a low refraction index material and a high refractive index material.

FIG. 8 illustrates the difference in ΔX between an original 13-layer prototype and an equivalent 13-layer non-periodic design at 0 and 45 degree angles of incidence with the diameters of the shaded circles shown on the graph proportional to ΔX between the original prototype and the equivalent layer design. The larger the shaded circle, the greater the value of ΔX, and thus the greater the shift in the maximum wavelength between the original 13-layer prototype and the equivalent non-periodic layer design made from two materials having that lower refractive indices. In this manner, refractive index pairs can be easily identified in which there is a small difference in the maximum wavelengths between the original 13-layer prototype and the equivalent non-periodic layer design. Similarly, FIG. 9 illustrates ΔX between an original 23-layer prototype and an equivalent 23-layer non-periodic design at 0 and 45 degree angles of incidence.

Figure 10:
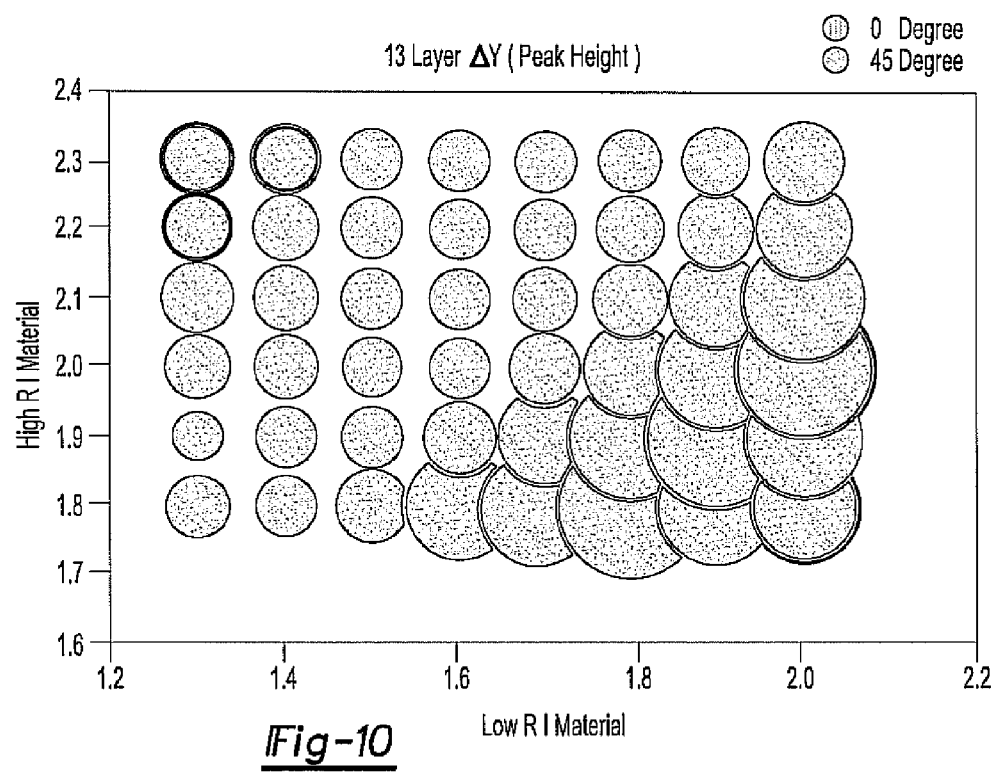
FIG. 10 is a plot of $\Delta Y$ between a 13-layer periodic structure and an equivalent 13-layer non-periodic structure for a 0 and 45 degree incidence angles as a function of refraction index values for a low refraction index material and a high refractive index material.
Figure 11:
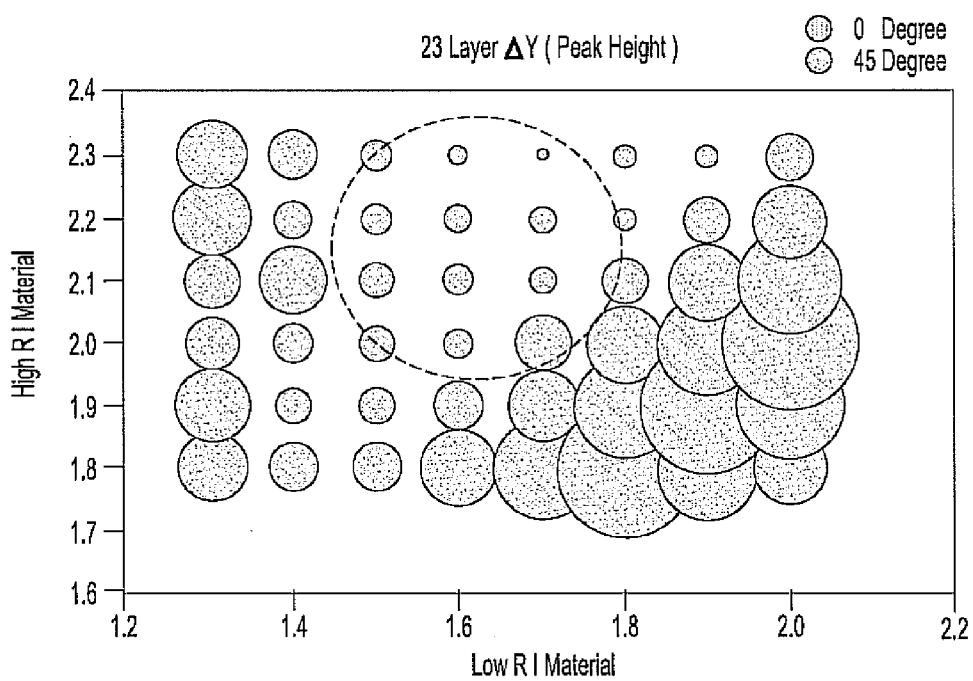
FIG. 11 is a plot of $\Delta Y$ between a 23-layer periodic structure and an equivalent 23-layer non-periodic structure for a 0 and 45 degree incidence angles as a function of refraction index values for a low refraction index material and a high refractive index material.

Turning now to FIGS. 10 and 11, ΔY between the 13-layer and 23-layer original prototypes and equivalent 13-layer and 23-layer non-periodic layer designs, respectively, are shown as a function of refractive index pairs for 0 and 45 degree incidence angles. As with FIGS. 8 and 9, review of FIGS. 10 and 11 allow easy identification of refractive index pairs in which there is a small difference in ΔX and ΔY between original multi-layer prototypes and equivalent non-periodic multi-layer designs. For example, review of FIGS. 8-11 illustrates that a first material with a refractive index in the range of 1.5 to 1.7 and a second material with a refractive index in the range of 2.0 to 2.3 could be suitable for making a non-periodic multilayer stack that exhibits omnidirectional structural color with a color/reflectance band centered about 575 nanometers.

It is appreciated that altering or selecting a different target reflection band (e.g. a different color) can change the actual trends shown in FIGS. 8-11. However, trends will still exist and thus identification of suitable refractive index pairs is provided.

Figure 12:
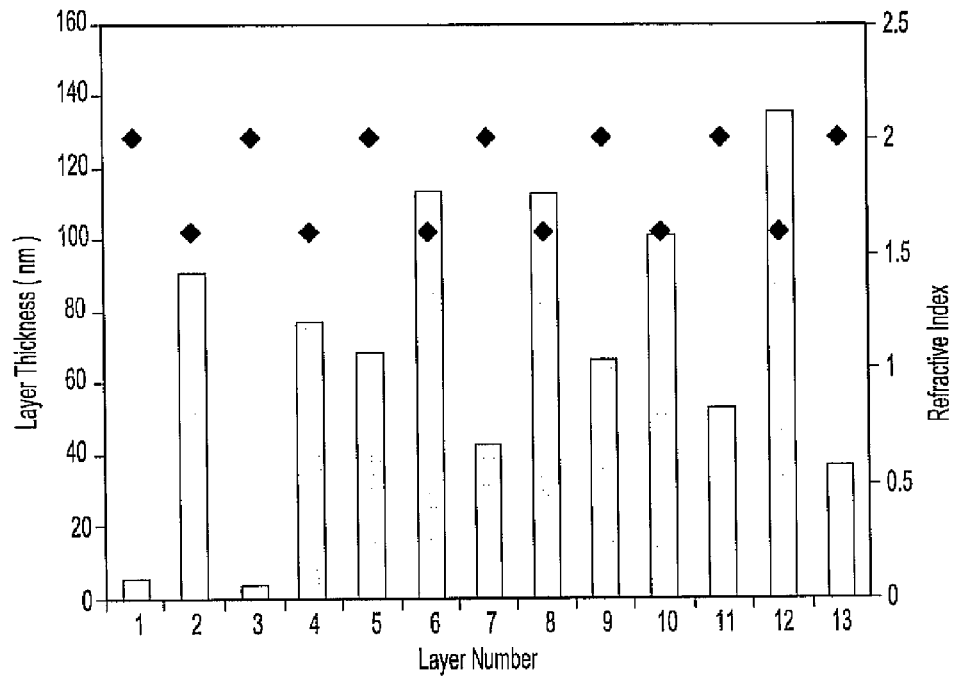
FIG. 12 is a plot of layer thickness and refractive indices for layers of a 13-layer non-periodic structure according to an embodiment of the present invention.
Figure 13:
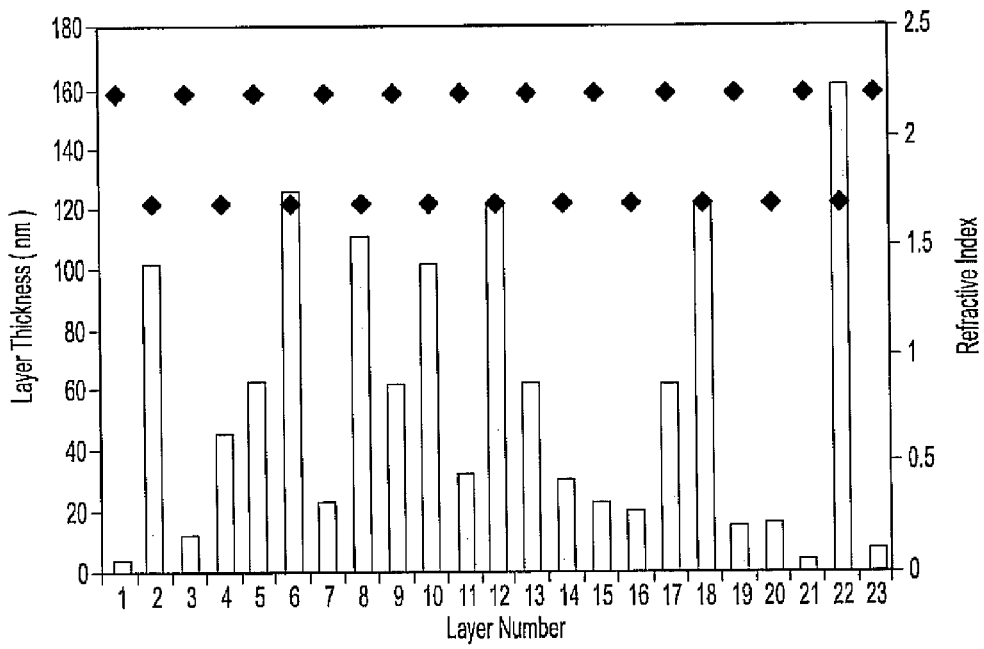
FIG. 13 is a plot of layer thickness and refractive indices for layers of a 23-layer non-periodic structure according to an embodiment of the present invention.

Illustrating actual design thicknesses for a non-periodic omnidirectional structural color, FIG. 12 shows a schematic thickness plot for a 13-layer non-periodic multilayer made from a first material having a refractive index of 2.0 and a second material having a refractive index of 1.6 are shown in FIG. 12. The thicknesses of the various layers are shown by the elongated rectangles which correspond to the left y-axis and the refractive index of each layer is shown by the solid diagonals which correspond to the right y-axis. Similarly, the layer thicknesses for a 23-layer non-periodic omnidirectional structural color made using a first material with a refractive index of 2.2 and a second material with a refractive index of 1.7 are shown in FIG. 13.

In this manner, an omnidirectional structural color can be designed and manufactured for most any given desired wavelength using a greater range of materials than previously available. Such materials include metals, semiconductors, ceramics, polymers, and combinations thereof. It is appreciated that the opportunity to use a greater range of materials further affords for a greater range of manufacturing techniques to make desired multilayer stacks/structures.

In addition to the above, the multilayer stack can have at least one third index of refraction material layer C1, at least one fourth index of refraction material D1, and/or at least one fifth index of refraction material layer E1. The at least one A1, B1, C1, D1 and/or E1 can each have the various material layers made from any material known to those skilled in the art having suitable refractive indices and known now, or in the future, to be used or can be suitably used to produce multilayer structures using processes, techniques, equipment, and the like such as sol gel techniques, vacuum deposition techniques, layer-by-layer techniques, etc.

Figure 14:
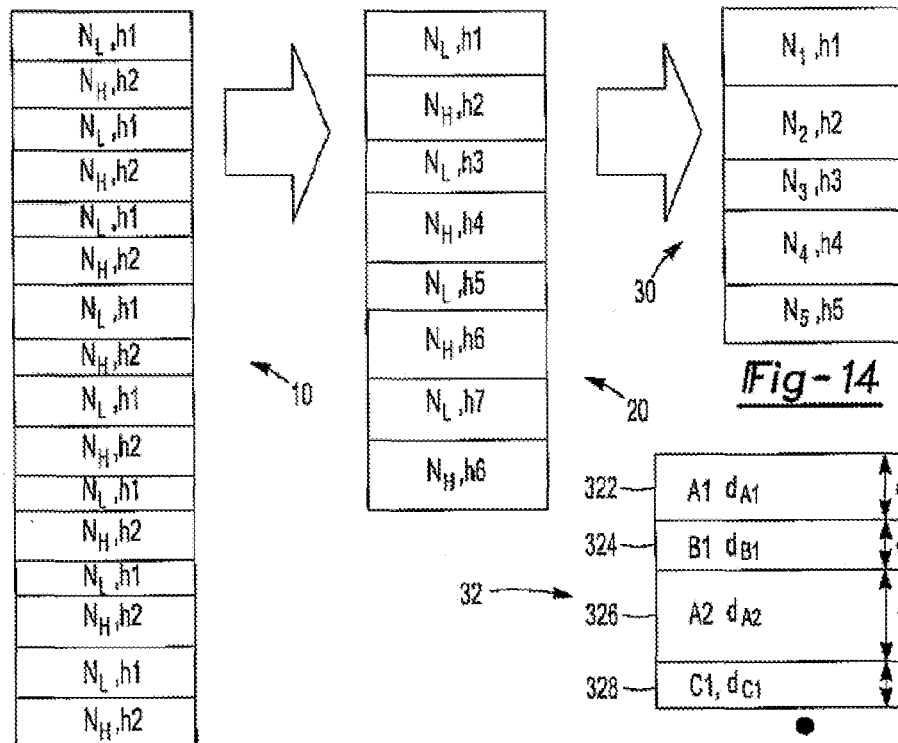
FIG. 14 is a schematic illustration representing improvements in omnidirectional structural color multilayer structures.

Turning now to FIG. 14, a schematic illustration is provided where an omnidirectional structural color (OSC) made from a multilayer stack 10 includes a plurality of alternating layers of low index of refraction material $N_L$ and high index of refraction material $N_H$. Each of the low and high index of refraction materials has a corresponding thickness of $h_1$ and $h_2$, respectively. In the alternative, an OSC having a multilayer stack 20 is disclosed herein in which the low index of refraction material $N_L$ and the high index of refraction material $N_H$ do not necessarily have the same thicknesses throughout the multilayer stack as indicated by the different thicknesses $h_1$, $h_2$, $h_3$, . . . $h_6$. With even further improvements disclosed herein, an OSC having a multilayer stack structure 30 includes a first index of refraction material $N_1$, a second index of refraction material $N_2$, a third index of refraction material $N_3$, a fourth index of refraction material $N_4$, and a fifth index of refraction material $N_5$. In addition, each of the material layers can have a different thickness as schematically illustrated by the different thicknesses $h_1$, $h_2$, $h_3$, $h_4$, and $h_5$.

Figure 15:
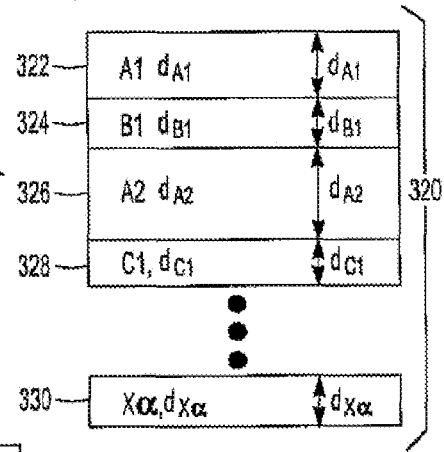
FIG. 15 is a schematic illustration of a multilayer stack according to an embodiment of the present invention.

FIG. 15 provides an alternative illustration of such a multilayer stack 30 as shown generally at reference numeral 32. The multilayer stack 32 has a plurality of layers 320 which for illustrative purposes only are shown as a first index of refraction material layer A1 shown at reference numeral 322, a second index of refraction material layer B1 shown at 324, an additional layer of the first index of refraction material A2 shown at 326, and a third index of refraction material layer C1 shown at 328. As also shown in FIG. 15, additional layers made from the first, second, or third index of refraction material can be included, as can layers made from different materials and illustratively shown as Xα at 330. Each of the layers 322-330 can have a unique thickness $d_{A1}$, $d_{B1}$, $d_{A2}$, $d_{C1}$, . . . $d_{Xα}$. In this manner, a multilayer stack having at least three layers, made from at least two different materials, and in some instances made from at least here different materials, and having a non-periodic layered structure is provided and used as an omnidirectional reflector.

Figure 16:
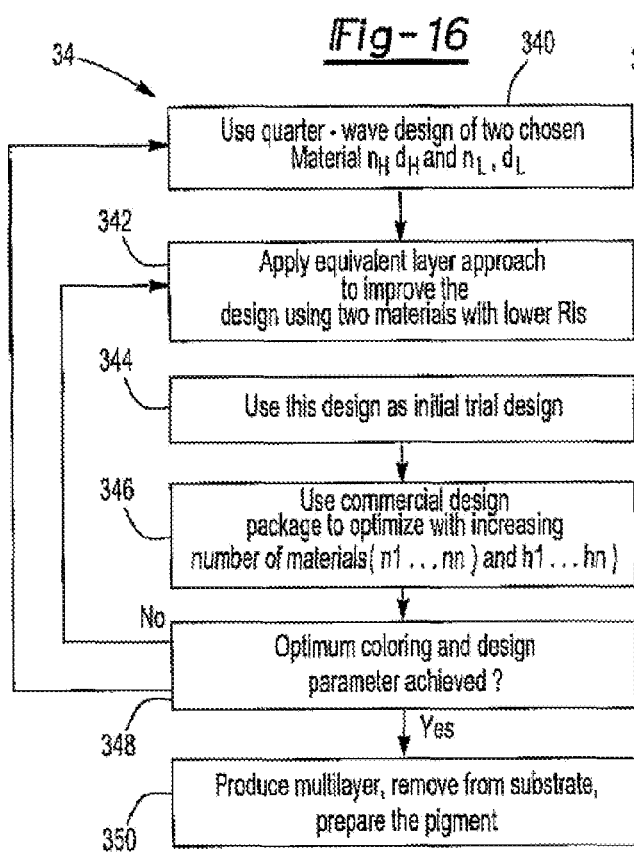
FIG. 16 is a schematic flowchart of a process for making a multilayer stack according to an embodiment of the present invention.

A process for making such an OSC, also referred to herein as an omnidirectional reflector, is shown generally at reference numeral 34 in FIG. 16. The process 34 can include using a quarter wave design of two materials for omnidirectional structural color having a desired omnidirectional reflection band at step 340. Thereafter, an equivalent layer approach can be applied to the quarter wave design developed at step 342 in order to improve the quarter wave design and afford for the use of alternate materials, for example materials having lower indices of refraction. The design provided or obtained at step 342 can be used at step 344 to provide an initial trial or, in the alternative, the quarter wave design developed at step 340 can be used for an initial trial at step 344. At step 346 additional optimization can be provided such that the number of materials is increased from two to at least three.

At step 348, the design provided at step 346 is determined as to whether or not optimum coloring, reflectance, design parameter, and the like have been achieved. In the event that a desired property or parameter has not been achieved, the process can start over at step 340 or start over at step 342. In the event that optimum coloring, design parameter, etc. has been achieved, the process can proceed to step 350 in which a multilayer stack is provided, removed from a substrate, and used to prepare a pigment. In the alternative, the multilayer stack can be applied as a thin film to a substrate and left there to provide desired coloring.

Using such a process as shown in FIG. 16, FIGS. 17-26 provide a series of results for various multilayer stack designs. For example, FIG. 17A provides a graphical representation of layer thickness and material for a seven-layer design using titanium oxide, silicon oxide, and zirconium oxide. As shown by the thicknesses of the various layers, a non-periodic layered structure is provided by the process 34. In addition, FIG. 17B provides a calculated percent reflectance as a function of electromagnetic radiation wavelength for the structure represented in FIG. 17A. As shown in FIG. 17B, the structure of FIG. 17A reflects at least 50% of a narrow band of electromagnetic radiation less than 100 nanometers and having a wavelength of approximately 525 nanometers when viewed from angles between 0 to 45 degrees. Stated differently, the structure of FIG. 17A has an omnidirectional band of less than 100 nanometers when exposed to a broad band of electromagnetic radiation and the broadband radiation is incident on the surface of such a structure at angles between 0 and 45 degrees.

FIGS. 18A and 18B provide a similar graphical representation of an eight-layer design and omnidirectional reflection band produced thereby. The eight-layer design has an initial layer of titanium oxide; alternating layers of silicon oxide, titanium oxide, and zirconium oxide; followed by a final layer of silicon oxide. FIG. 18B illustrates that such a structure has a narrow omnidirectional reflection band that reflects at least 50% of a narrow band of radiation at approximately 525 nanometers. In addition, the eight-layer design exhibits reduced side bands when compared to the design of FIG. 17.

Figure 19A:
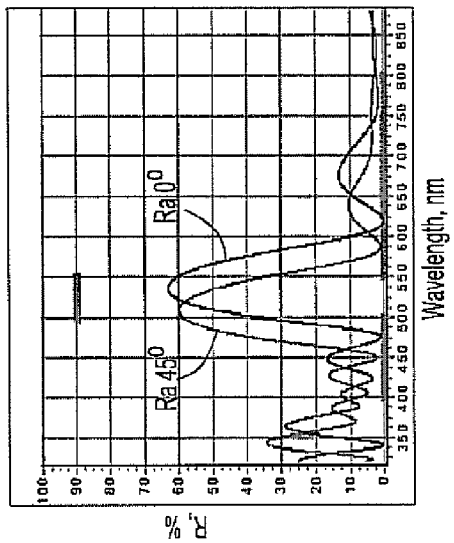
FIG. 19 is: (A) a graphical representation for the thickness and material for each layer of a 10-layer $TiO_2$—$SiO_2$—$ZrO_2$ multilayer stack design; and (B) a corresponding graphical representation illustrating an omnidirectional band for the multilayer stack in (A)
Figure 19B:
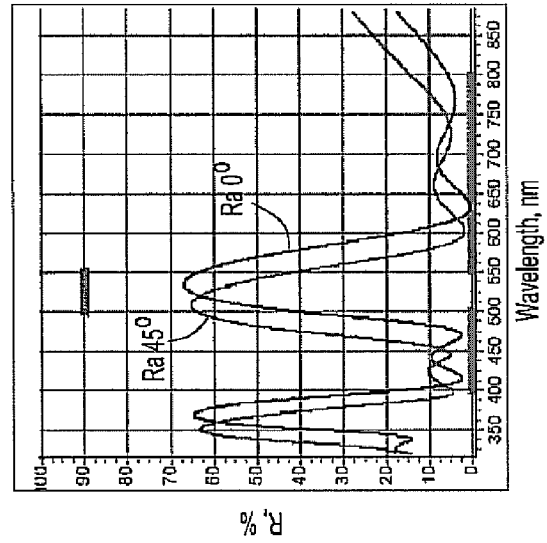

FIG. 19 shows the results for a ten-layer design made from titanium oxide, silicon oxide, and zirconium oxide.

Figure 20A:
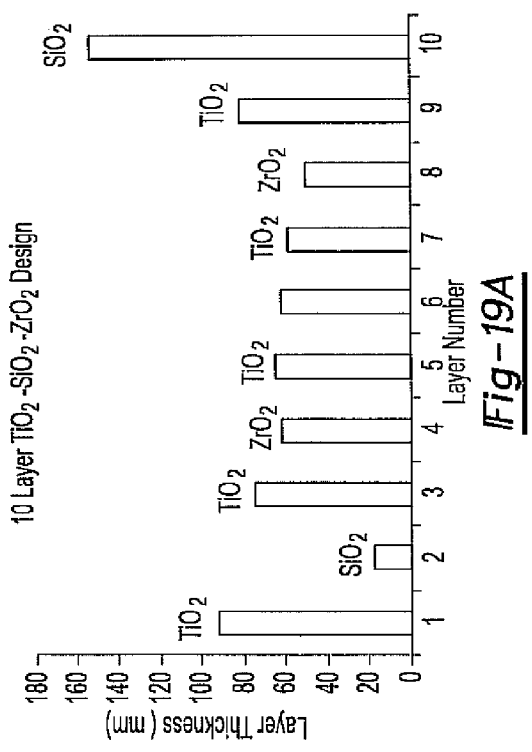
FIG. 20 is: (A) a graphical representation for the thickness and material for each layer of an 11-layer $TiO_2$—$ZrO_2$—Cr—$Nb_2O_5$ multilayer stack design; and (B) a corresponding graphical representation illustrating an omnidirectional band for the multilayer stack in (A)
Figure 20B:
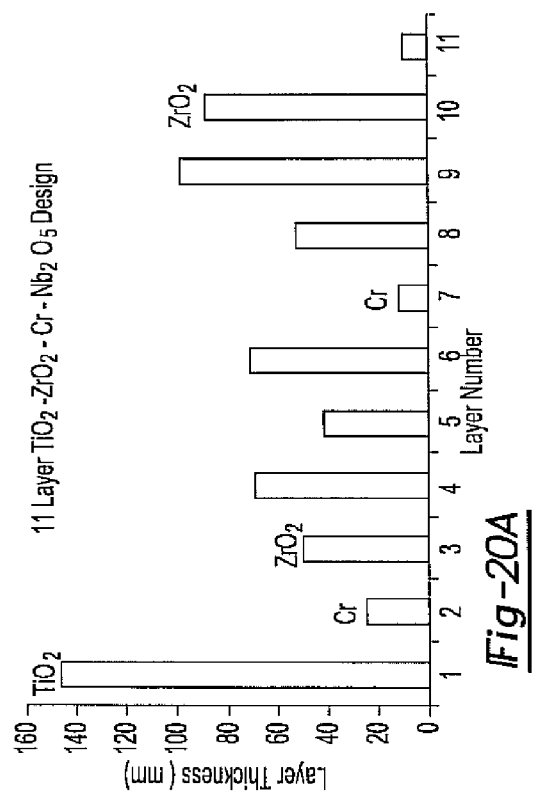

Looking now to FIG. 20, an eleven-layer design made from titanium oxide, zirconium oxide, chromium, and niobium oxide is shown. FIG. 20A shows the various layer thicknesses for the various layers, and FIG. 20B shows the reflectance as a function of electromagnetic radiation wavelength. As can be seen in FIG. 20B, the structure of FIG. 20A provides a first omnidirectional reflection band that reflects at least 50% of a narrow band of radiation at approximately 525 nanometers when viewed from angles between 0 to 45 degrees. In addition, a second omnidirectional reflection band in the infrared region at approximately 360 nanometers is provided by the design illustrated in FIG. 20A.

FIG. 21 provides a similar graphical representation and reflectance as a function of wavelength for a twelve-layer design using titanium oxide, silver, chromium, zirconium oxide, and niobium oxide materials. FIG. 22 shows a thirteen-layer design for the same materials used in FIG. 21 except for the addition of silicon oxide.

Figure 23A:
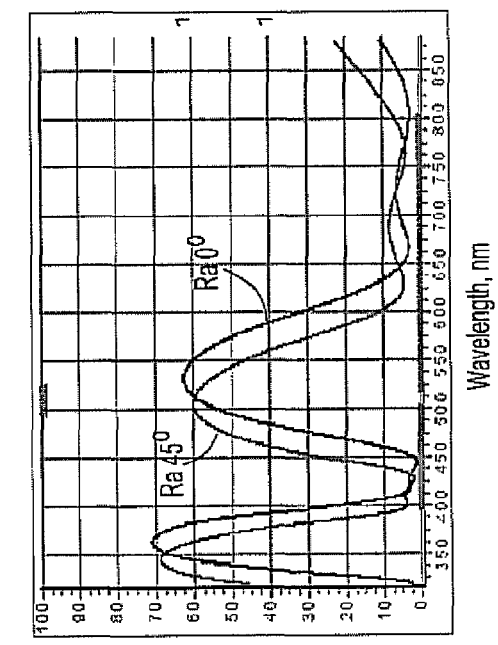
FIG. 23 is: (A) a graphical representation for the thickness and material for each layer of a 3-layer $TiO_2$—$SiO_2$ multilayer stack design; and (B) a corresponding graphical representation illustrating an omnidirectional band for the multilayer stack in (A)
Figure 23B:
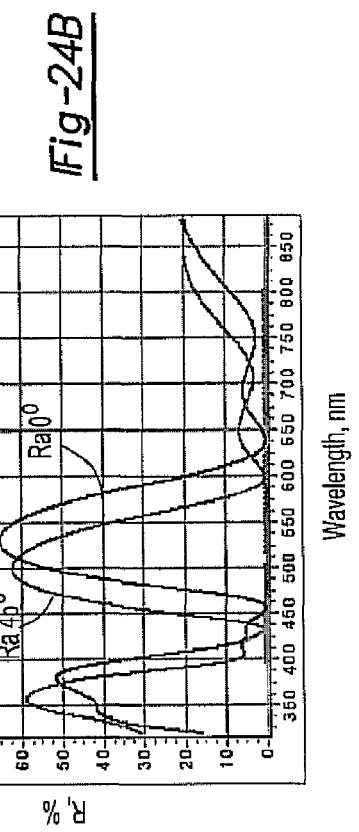
Figure 24A:
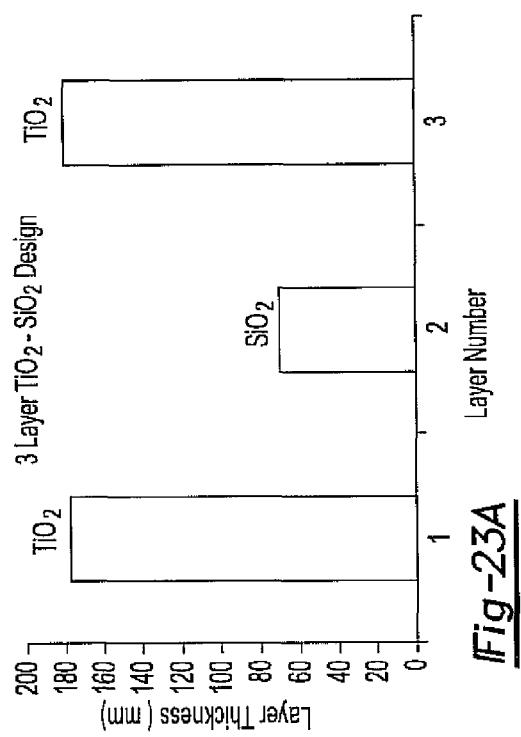
FIG. 24 is: (A) a graphical representation for the thickness and material for each layer of a 5-layer $TiO_2$—$SiO_2$-Mica multilayer stack design; and (B) a corresponding graphical representation illustrating an omnidirectional band for the multilayer stack in (A)
Figure 24B:
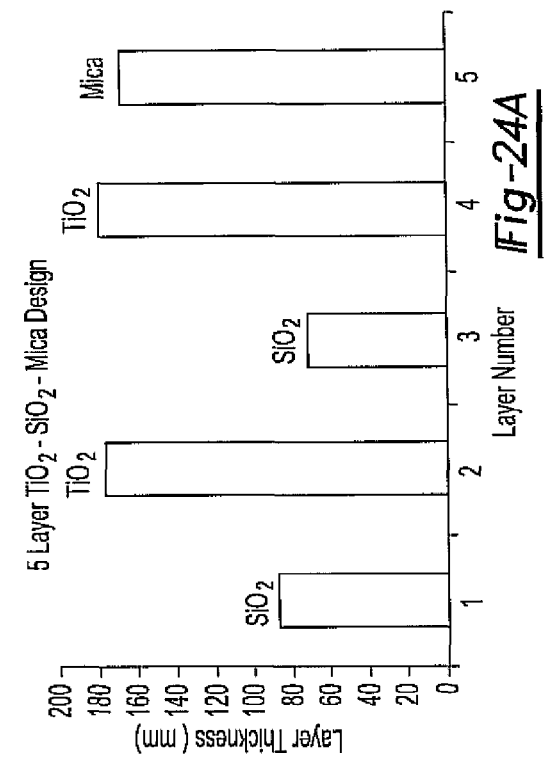

In an effort to further reduce the number of layers for a multilayer stack, process 34 was used to design the three-layer stack shown in FIG. 23 and the five-layer design shown in FIG. 24. The three-layer design containing titanium oxide and silicon oxide materials exhibited a calculated reflectance spectrum as shown in FIG. 23B and the five-layer design in which titanium oxide, silicon oxide, and mica were used in the process 34 exhibited a reflectance spectrum shown in FIG. 24B.

Figure 25B:
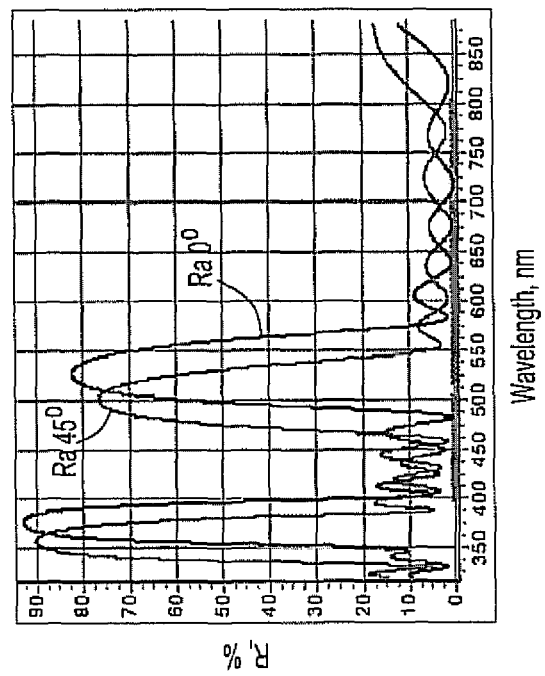
FIG. 25 is: (A) a graphical representation for the thickness and material for each layer of a 7-layer $TiO_2$—$SiO_2$-Mica multilayer stack design; and (B) a corresponding graphical representation illustrating an omnidirectional band for the multilayer stack in (A)
Figure 26B:
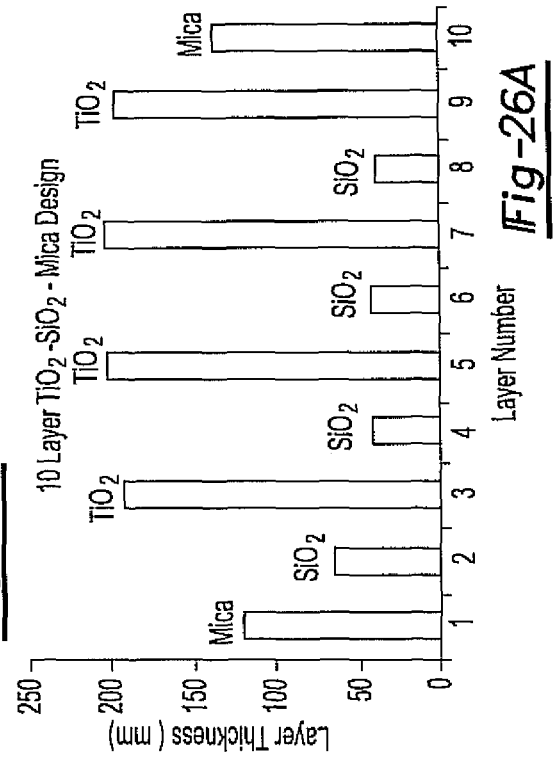
FIG. 26 is: (A) a graphical representation for the thickness and material for each layer of a 10-layer $TiO_2$—$SiO_2$-Mica multilayer stack design; and (B) a corresponding graphical representation illustrating an omnidirectional band for the multilayer stack in (A).
Figure 25A:
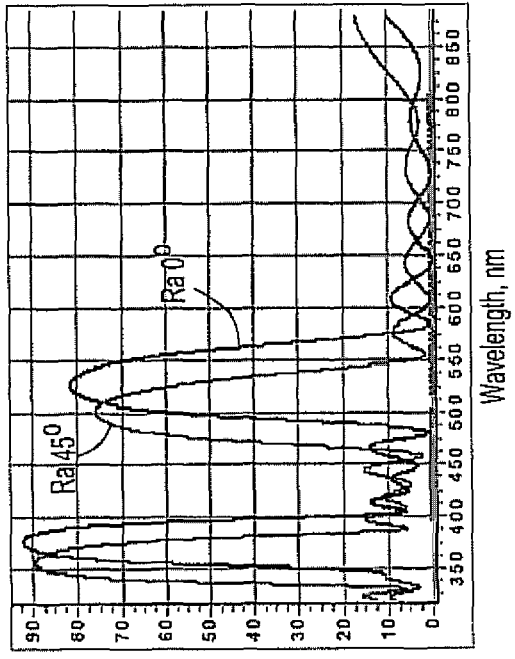
Figure 26A:
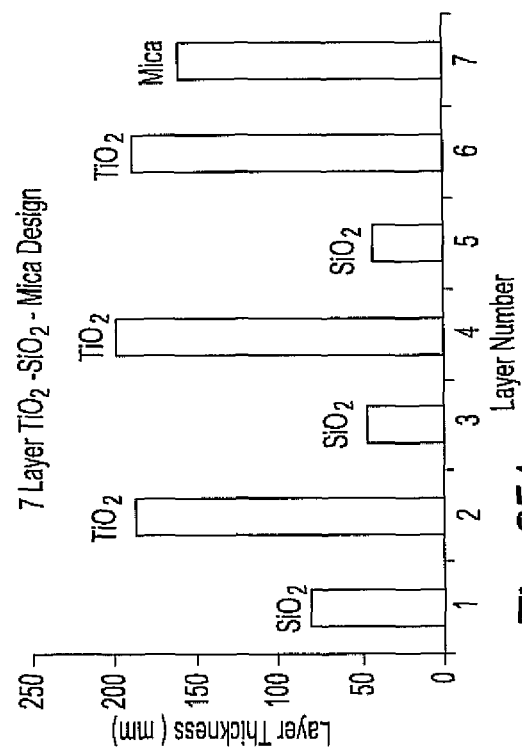

A seven-layer design and a ten-layer design using the same materials, that is titanium oxide, silicon oxide, and mica, are shown in FIGS. 25 and 26, respectively. It is appreciated from the reflectance spectrum for the three-layer, five-layer, seven-layer, and ten-layer designs illustrated in FIGS. 23-26 that such multilayer structures exhibit omnidirectional reflection bands within the visible light spectrum, for example approximately 525 nanometers, in addition to an infrared omnidirectional reflection band at approximately 350 nanometers.

In this manner, an omnidirectional structural color can be designed and manufactured for most any given desired wavelength using a greater range of materials than previously available. It is appreciated that multilayer designs using more than two materials as disclosed above are completely novel. Such materials include metals, semiconductors, ceramics, polymers, and combinations thereof. For example and for illustrative purposes only, Table 2 below provides a list of illustrative materials for production of multilayer stacks. It is appreciated that the opportunity to use a greater range of materials further affords for a greater range of manufacturing techniques to make desired multilayer stacks/structures. In addition, multilayer stacks/structures disclosed herein can further be used to make pigments for paints and the like.

TABLE 2

| Refractive Index Materials (visible region) | | Refractive Index Materials (visible region) | |
| --- | --- | --- | --- |
| Material | Refractive Index | Material | Refractive Index |
| Germanium (Ge) | 4.0-5.0 | Chromium (Cr) | 3.0 |
| Tellurium (Te) | 4.6 | Tin Sulfide (SnS) | 2.6 |
| Gallium Antimonite (GaSb) | 4.5-5.0 | Low Porous Si | 2.56 |
| Indium Arsenide (InAs) | 4.0 | Chalcogenide glass | 2.6 |
| Silicon (Si) | 3.7 | Cerium Oxide ($CeO_2$) | 2.53 |
| Indium Phosphate (InP) | 3.5 | Tungsten (W) | 2.5 |
| Gallium Arsenate (GaAs) | 3.53 | Gallium Nitride (GaN) | 2.5 |
| Gallium Phosphate (GaP) | 3.31 | Manganese (Mn) | 2.5 |
| Vanadium (V) | 3 | Niobium Oxide ($Nb_2O_3$) | 2.4 |
| Arsenic Selenide ($As_2Se_3$) | 2.8 | Zinc Telluride (ZnTe) | 3.0 |
| $CuAlSe_2$ | 2.75 | Chalcogenide glass + Ag | 3.0 |
| Zinc Selenide (ZnSe) | 2.5-2.6 | Zinc Sulfate (ZnSe) | 2.5-3.0 |
| Titanium Dioxide ($TiO_2$)-solgel | 2.36 | Titanium Dioxide ($TiO_2$)-vacuum deposited | 2.43 |
| Alumina Oxide (Al2O3) | 1.75 | Hafnium Oxide ($HfO_2$) | 2.0 |
| Yttrium Oxide (Y2O3) | 1.75 | Sodium Aluminum Fluoride (Na3AlF6) | 1.6 |

TABLE 2-continued

| Refractive Index Materials (visible region) | | Refractive Index Materials (visible region) | |
|---|---|---|---|
| Material | Refractive Index | Material | Refractive Index |
| Polystyrene | 1.6 | Polyether Sulfone (PES) | 1.55 |
| Magnesium Fluoride (MgF2) | 1.37 | High Porous Si | 1.5 |
| Lead Fluoride (PbF2) | 1.6 | Indium Tin Oxide nanorods (ITO) | 1.46 |
| Potassium Fluoride (KF) | 1.5 | Lithium Fluoride (LiF4) | 1.45 |
| Polyethylene (PE) | 1.5 | Calcium Fluoride | 1.43 |
| Barium Fluoride (BaF2) | 1.5 | Strontium Fluoride (SrF2) | 1.43 |
| Silica (SiO2) | 1.5 | Lithium Fluoride (LiF) | 1.39 |
| PMMA | 1.5 | PKFE | 1.6 |
| Aluminum Arsenate (AlAs) | 1.56 | Sodium Fluoride (NaF) | 1.3 |
| Solgel Silica (SiO2) | 1.47 | Nano-porous Silica (SiO2) | 1.23 |
| N,N' bis(lnaphthyl)-4,4'Diamine (NPB) | 1.7 | Sputtered Silica (SiO2) | 1.47 |
| Polyamide-imide (PEI) | 1.6 | Vacuum Deposited Silica (SiO2) | 1.46 |
| Zinc Sulfide (ZnS) | 2.3 + i(0.015) | Niobium Oxide ($Nb_2O_5$) | 2.1 |
| Titanium Nitride (TiN) | 1.5 + i(2.0) | Aluminum (Al) | 2.0 + i(15) |
| Chromium (Cr) | 2.5 + i(2.5) | Silicon Nitride (SiN) | 2.1 |
| Niobium Pentoxide(Nb2O5) | 2.4 | Mica | 1.56 |
| Zirconium Oxide (ZrO2) | 2.36 | Polyallomer | 1.492 |
| Hafnium Oxide (HfO2) | 1.9-2.0 | Polybutylene | 1.50 |
| Fluorcarbon (FEP) | 1.34 | Ionomers | 1.51 |
| Polytetrafluro-Ethylene (TFE) | 1.35 | Polyethylene (Low Density) | 1.51 |
| Fluorcarbon (FEP) | 1.34 | Nylons (PA) Type II | 1.52 |
| Polytetrafluro-Ethylene(TFE) | 1.35 | Acrylics Multipolymer | 1.52 |
| Chlorotrifluoro-Ethylene(CTFE) | 1.42 | Polyethylene (Medium Density) | 1.52 |
| Cellulose Propionate | 1.46 | Styrene Butadiene Thermoplastic | 1.52-1.55 |
| Cellulose Acetate Butyrate | 1.46-1.49 | PVC (Rigid) | 1.52-1.55 |
| Cellulose Acetate | 1.46-1.50 | Nylons (Polyamide) Type 6/6 | 1.53 |
| Methylpentene Polymer | 1.485 | Urea Formaldehyde | 1.54-1.58 |
| Acetal Homopolymer | 1.48 | Polyethylene (High Density) | 1.54 |
| Acrylics | 1.49 | Styrene Acrylonitrile Copolymer | 1.56-1.57 |
| Cellulose Nitrate | 1.49-1.51 | Polystyrene (Heat & Chemical) | 1.57-1.60 |
| Ethyl Cellulose | 1.47 | Polystyrene (General Purpose) | 1.59 |
| Polypropylene | 1.49 | Polycarbornate (Unfilled) | 1.586 |
| Polysulfone | 1.633 | | |

The invention is not restricted to the examples described above. The examples are not intended as limitations on the scope of the invention; and methods, apparatus, compositions, materials, and the like described herein are exemplary and not intended as limitations on the scope of the invention. Changes and other uses will occur to those skilled in the art. As such, the scope of the invention is defined by the scope of the claims.

We claim:

1. An omnidirectional structural color (OSC) having a non-periodic layered structure, said OSC comprising:
    a multilayer stack having an outer surface and at least five layers, said at least five layers having at least two first index of refraction oxide material layers A1 and A2, at least two second index of refraction oxide material layers B1 and B2, said at least two layers A1 and A2 and at least two layers B1 and B2 alternately stacked on top of each other;
    said at least A1, A2, B1 and B2 layers having a predefined thickness of $d_{A1}$, $d_{A2}$, $d_{B1}$ and $d_{B2}$, with said $d_{A1}$ thickness not generally equal to said $d_{A2}$, $d_{B1}$ or said $d_{B2}$ thickness such that said multilayer stack has a non-periodic layered structure; and
    said multilayer stack defining a reflector, said reflector having a single first reflection band with a center wavelength in the visible light spectrum, said single first reflection band being a reflectance of more than 50% of said center wavelength of a band of reflected electromagnetic radiation, said first reflection band also having a full width at half maximum (FWHM) of less than 200 nanometers and a shift of said center wavelength of less than 50 nanometers when said outer surface is exposed to a generally broad band of electromagnetic radiation at angles between 0 and 45 degrees with respect to the normal of said outer surface.

2. The OSC of claim 1, further comprising at least one third index of refraction material layer C1 having a predefined thickness $d_{C1}$, said at least two layers A1 and A2 and said at least two layers B1 and B2 alternately stacked on top of each other and on top of said C1 layer and said $d_{C1}$ thickness not generally equal to said $d_{A1}$ or $d_{A2}$ thickness.

3. The OSC of claim 2, wherein said band of reflected electromagnetic radiation has a FWHM of less than 100 nanometers.

4. The OSC of claim 2, wherein said multilayer stack has a second reflection band, said second reflection band being a reflectance of more than 50% of ultraviolet electromagnetic radiation having a center wavelength of less than 400 nanometers.

5. The OSC of claim 2, wherein said A1, A2, B1, B2 and C1 layers are selected from a group consisting of titania, silica, mica, zirconium oxide, niobium oxide, chromium and silver.

6. A process for omnidirectionally reflecting a band of electromagnetic radiation, the process comprising:
   providing a multilayer stack having an outer surface and at least five layers, the at least five layers having at least two first index of refraction oxide material layers A1 and A2, at least two second index of refraction oxide material layers B1 and B2, the at least two layers A1 and A2 and at least two layers B1 and B2 alternately stacked on top of each other;
   the at least A1, A2, B1 and B2 layers having a predefined thickness of $d_{A1}$, $d_{A2}$, $d_{B1}$ and $d_{B2}$, with the $d_{A1}$ thickness not generally equal to the $d_{A2}$, $d_{B1}$ or $d_{B2}$ thickness such that the multilayer stack has a non-periodic layered structure and defines a reflector; and
   providing a source of broadband electromagnetic radiation;
   exposing the multilayer stack to the broad band electromagnetic radiation at angles between 0 and 45 degrees with respect to the normal of the outer surface; and
   the reflector reflecting a single first reflection band with a center wavelength in the visible light spectrum, the single first reflection band being a reflectance of more than 50% of the center wavelength of a band of reflected electromagnetic radiation, the single first reflection band also having a full width at half maximum (FWHM) of less than 200 nanometers wide and a shift of the center wavelength of less than 50 nanometers when an outer surface of the multilayer stack is exposed to the generally broad band of electromagnetic radiation at angles between 0 and 45 degrees with respect to the normal of the outer surface.

7. The process of claim 6, further comprising the multilayer stack having at least one third index of refraction material layer C1 having a predefined thickness $d_{C1}$ not equal to the $d_{A1}$ or $d_{A2}$ thickness, the at least two layers A1 and A2 and the at least two layers B1 and B2 alternately stacked on top of each other and on top of the C1 layer.

8. The process of claim 7, further comprising the reflector reflecting a second reflection band in the ultraviolet electromagnetic radiation spectrum, the second reflection band having a center wavelength of less than 400 nanometers and being a reflection of more than 50% of the center wavelength.

9. The process of claim 7, wherein A1, B1 and C1 are selected from a group consisting of titania, silica, mica, zirconium oxide, niobium oxide, chromium and silver.

* * * * *